(12) United States Patent
Zhou et al.

(10) Patent No.: US 12,525,908 B2
(45) Date of Patent: Jan. 13, 2026

(54) CONTROL METHOD, CONTROL APPARATUS AND CONTROL SYSTEM FOR ELETRIC MOTOR, AND COMPUTER-READABLE STORAGE MEDIUM AND AIR CONDITIONER

(71) Applicants: HEFEI MIDEA HEATING & VENTILATING EQUIPMENT CO., LTD., Anhui (CN); GD MIDEA HEATING & VENTILATING EQUIPMENT CO., LTD., Guangdong (CN)

(72) Inventors: Chao Zhou, Anhui (CN); Haohao Wang, Anhui (CN); Junhua Chen, Anhui (CN); Weihong Hong, Anhui (CN)

(73) Assignees: HEFEI MIDEA HEATING & VENTILATING EQUIPMENT CO., LTD., Anhui (CN); GD MIDEA HEATING & VENTILATING EQUIPMENT CO., LTD., Guangdong (CN)

(*) Notice: Subject to any disclaimer, the term of this patent is extended or adjusted under 35 U.S.C. 154(b) by 165 days.

(21) Appl. No.: 18/563,974

(22) PCT Filed: Jan. 3, 2023

(86) PCT No.: PCT/CN2023/070147
§ 371 (c)(1),
(2) Date: Nov. 24, 2023

(87) PCT Pub. No.: WO2023/138357
PCT Pub. Date: Jul. 27, 2023

(65) Prior Publication Data
US 2024/0258942 A1    Aug. 1, 2024

(30) Foreign Application Priority Data

Jan. 18, 2022  (CN) .......................... 202210055709.6

(51) Int. Cl.
*H02P 21/34* (2016.01)
*H02P 21/18* (2016.01)

(52) U.S. Cl.
CPC .............. *H02P 21/34* (2016.02); *H02P 21/18* (2016.02)

(58) Field of Classification Search
CPC .......... H02P 21/34; H02P 21/18; H02P 1/029; H02P 6/182; H02P 6/21; H02P 6/22; H02P 6/20

(Continued)

(56) References Cited

U.S. PATENT DOCUMENTS 7,227,326 B1* 6/2007 Lu ........................... H02P 6/185
                                                     318/461
10,439,526 B2* 10/2019 Tian ........................ H02P 6/21

(Continued)

FOREIGN PATENT DOCUMENTS

CN      106208882 A     12/2016
CN      108418480 A     8/2018

(Continued)

OTHER PUBLICATIONS

International Search Report dated Mar. 8, 2023 issued in PCT/CN2023/070147.

(Continued)

*Primary Examiner* — David Luo
(74) *Attorney, Agent, or Firm* — SCULLY, SCOTT, MURPHY & PRESSER, P.C.

(57) ABSTRACT

A control method, control apparatus and control system for an electric motor, and a computer-readable storage medium (Continued)

are provided. The control method for an electric motor includes: acquiring an initial rotation speed and an initial rotation direction of an electric motor; determining a target start mode for the electric motor according to the initial rotation speed and the initial rotation direction; and according to the target start mode, controlling the electric motor to start. A target start mode, which most conforms to an initial rotation speed and an initial rotation speed direction of an electric motor, can be determined from a plurality of preset start modes, so as to control the electric motor to start.

18 Claims, 6 Drawing Sheets

(58) Field of Classification Search
USPC .............................. 318/400.02, 400.01, 700
See application file for complete search history.

(56) References Cited

U.S. PATENT DOCUMENTS 11,817,804 B2 * 11/2023 Li ....................... H02P 21/141
2007/0001635 A1    1/2007 Ho

FOREIGN PATENT DOCUMENTS

| CN | 109194228 A | 1/2019 |
| CN | 109245654 A | 1/2019 |
| CN | 109372787 A | 2/2019 |
| CN | 109379007 A | 2/2019 |
| CN | 114421844 A | 4/2022 |
| JP | 2011120421 A | 6/2011 |

OTHER PUBLICATIONS

First Office Action dated May 8, 2025 received in Chinese Patent Application No. 202210055709.6.

* cited by examiner

CONTROL METHOD, CONTROL APPARATUS AND CONTROL SYSTEM FOR ELETRIC MOTOR, AND COMPUTER-READABLE STORAGE MEDIUM AND AIR CONDITIONER

CROSS-REFERENCE TO RELATED APPLICATIONS

This application is a National Stage Entry under 35 U.S.C. § 371 of PCT International Application No. PCT/CN2023/070147, filed on Jan. 3, 2023, which claims priority to Chinese Patent Application Serial No. 202210055709.6, filed with the National Intellectual Property Administration of PRC on Jan. 18, 2022, with an invention title "control method, control apparatus, and control system for electric motor and readable storage medium", the entire content of each of which is incorporated herein by reference.

FIELD

The present disclosure relates to the field of electric motor technology, and particularly relates to a control method, a control apparatus, and a control system for an electric motor, as well as a storage medium and an air conditioner.

BACKGROUND

In the field of household appliances, a permanent magnet synchronous machine (PMSM) is generally under sensorless field oriented control (FOC) in view of cost consideration. A counter-electromotive force-based estimation algorithm predominates in estimation algorithms for a rotation speed of the PMSM. An actual rotation speed and position of an electric motor before starting can be acknowledged for a speed sensor or position sensor-based FOC PMSM control system which is provided with an encoder; while the initial rotation speed and the position of a rotor in the electric motor before starting need to be estimated for a sensorless FOC PMSM control system. Besides, it has not been taken the Sensorless FOC PMSM control system starting with an initial rotation speed into account sufficiently in the prior art, which cannot guarantee the Sensorless FOC PMSM control system to start smoothly under various circumstances.

SUMMARY

The present disclosure aims to solve at least one of the technical problems in the related art.

For this, in an aspect, the present disclosure provides in embodiments a control method for an electric motor.

In another aspect, the present disclosure provides in embodiments a control apparatus for an electric motor.

In still another aspect, the present disclosure provides in embodiments a control system for an electric motor.

In yet another aspect, the present disclosure provides in embodiments a control system for an electric motor.

In still another aspect, the present disclosure provides in embodiments a computer-readable storage medium.

In still another aspect, the present disclosure provides in embodiments an air conditioner.

In view of this, in an aspect, the present disclosure provides in embodiments a control method for an electric motor, including: acquiring an initial rotation speed and an initial rotation speed direction of the electric motor; determining a target start mode for the electric motor according to the initial rotation speed and the initial rotation speed direction; and controlling the electric motor to start in accordance with the target start mode.

In this technical solution, for guaranteeing the electric motor to start smoothly under various circumstances, various initial rotation speeds and various initial rotation speed directions of the electric motor are taken into consideration for the smooth start. In specific, several preset start modes are set in advance, where different initial rotation speeds and different initial rotation speed directions correspond to different start modes, and different start modes in turn decide different start schemes at a start stage of the electric motor.

The initial rotation speed and the initial rotation speed direction are identified in the detection state; the target start mode corresponding to the initial rotation speed and the initial rotation speed direction are determined in several preset start modes, according to the initial rotation speed and the initial rotation speed direction identified in the detection state; and the electric motor is controlled to enter the start stage according to the target start mode.

It should be noted that the electric motor as describe above is the PMSM, applicable to both a built-in permanent magnet synchronous machine and a surface permanent magnet synchronous machine, and particularly is the Sensorless FOC PMSM.

According to embodiments of the present disclosure, the control method can determine an optimal target start mode for the initial rotation speed and the initial rotation speed direction of the electric motor among several preset start modes, thus controlling the electric motor to start. According to embodiments of the present disclosure, the control method can guarantee the sensorless FOC PMSM to start reliably and smoothly under various rotation speed conditions.

Besides, due to consideration of the initial rotation speed before starting, a process of detecting a magnitude and a direction of the initial rotation speed is also referred to a CatchSpin state in embodiments of the present disclosure. In other words, in embodiments of the present disclosure, the initial rotation speed and the initial rotation speed direction of the electric motor are estimated in the CatchSpin state (also referred to as "a detection state"). Accordingly, the present disclosure also provides in embodiments a control method for the electric motor, switching from the CatchSpin state to a start state smoothly.

According to embodiments of the present disclosure, the control method for the electric motor may further have the following additional features.

In the above technical solution, controlling the electric motor to start in accordance with the target start mode includes: determining a scheme of switching a rotation speed control state corresponding to the target start mode; and controlling the electric motor to start in accordance with the scheme of switching the rotation speed control state.

In this technical solution, several preset start modes include: a high-speed reverse-direction start mode, a low-speed reverse-direction start mode, a static start mode, a low-speed forward-direction start mode, and a high-speed forward-direction start mode. In a process of controlling the electric motor to start, based on that the electric motor starts with the initial rotation speed, in an embodiment of the present disclosure, according to the magnitude and the direction of the initial rotation speed, starting of the Sensorless FOC PMSM control system is classified into five start modes, i.e., the high-speed reverse-direction start mode, the low-speed reverse-direction start mode, the static start mode, the low-speed forward-direction start mode, and the high-speed forward-direction start mode, which cover all circumstances for the electric motor starting, guaranteeing a starting effect of the electric motor under various start conditions.

The target start mode is determined from several preset start modes according to the initial rotation speed and the initial rotation speed direction identified in the detection state; the electric motor is in turn controlled to start according to a start scheme corresponding to the target start mode. It should be noted that the start scheme is the scheme of switching the rotation speed control state.

In embodiments of the present disclosure, the control method takes all circumstances under which the electric motor starts, enabling the electric motor to start in accordance with the start scheme meeting the magnitude and the direction of the initial rotation speed, thus improving the reliability and smoothness for starting the electric motor, and guaranteeing the starting effect of the electric motor under various start conditions.

In any of the above embodiments, determining the target start mode for the electric motor according to the initial rotation speed and the initial rotation speed direction includes: in response to the initial rotation speed being greater than a first threshold and the initial rotation speed direction being a reverse direction, determining the target start mode to be a high-speed reverse-direction start mode, wherein the scheme of switching the rotation speed control state corresponding to the high-speed reverse-direction start mode is: switching from a detection state to a rotation speed close-loop state, then switching from the rotation speed close-loop state to a rotation speed open-loop state, and then switching from the rotation speed open-loop state to the rotation speed close-loop state.

In this technical solution, a condition, where the magnitude of the initial rotation speed of the electric motor exceeds a first threshold and the direction of the initial rotation speed of the electric motor is a reverse direction, indicates that the electric motor is of the reverse direction of the initial rotation speed and has a very high initial rotation speed, it is then determined that the electric motor is in the high-speed headwind state before starting, thus entering a high-speed reverse-direction start mode.

For the high-speed reverse-direction start mode, it is firstly switching from the CatchSpin state to a rotation speed close-loop (CloseLoop) state; then switching from the CloseLoop state to a rotation speed open-loop (OpenLoop) state, to establish a reliable counter-electromotive force (at this time, the estimated rotation speed of the electric motor is reliable and smooth); and thus at this time switching from the OpenLoop state to the CloseLoop state. That is, the involved scheme of switching the rotation speed control state is: the detection state→the CloseLoop state→the OpenLoop state→the CloseLoop state.

It should be noted that in the high-speed reverse-direction start mode, a current loop is a close-loop state. The purpose of switching from the CatchSpin state to the CloseLoop state is to more effectively decelerate and then switch from the CloseLoop state to the OpenLoop state when the rotation speed is inaccurate.

The above switching scheme achieves, in the high-speed reverse-direction start mode, establishing the reliable counter-electromotive force, and then finally switching to the CloseLoop state, thus guaranteeing the sensorless FOC PMSM to start reliably and smoothly, without cost increased, improving starting performance of the PMSM, thereby expanding application scenarios of the Sensorless FOC PMSM control system.

In any of the above embodiments, determining the target start mode for the electric motor according to the initial rotation speed and the initial rotation speed direction includes: in response to the initial rotation speed being greater than or equal to a second threshold and lower than or equal to a first threshold, and the initial rotation speed direction being a reverse direction or a forward direction, determining the target start mode to be a low-speed start mode, wherein the scheme of switching the rotation speed control state corresponding to the low-speed start mode is: switching from a detection state to a rotation speed open-loop state, and then switching from the rotation speed open-loop state to a rotation speed close-loop state, wherein the first threshold is greater than the second threshold.

In this technical solution, the low-speed start mode includes a low-speed reverse-direction start mode and a low-speed forward-direction start mode.

A condition, where the magnitude of the initial rotation speed of the electric motor exceeds a second threshold but does not exceed a first threshold; and the direction of the initial rotation speed is a reverse direction, indicates that the electric motor is of the reverse direction of the initial rotation speed and has a less high initial rotation speed, it is then determined that the electric motor is in a weak headwind state before starting, thus entering the low-speed reverse-direction start mode. For the low-speed reverse-direction start mode, it is first switching from the detection state to the OpenLoop state, to establish a reliable counter-electromotive force (at this time, the estimated rotation speed of the electric motor is reliable and smooth); and thus at this time switching from the OpenLoop state to the CloseLoop state.

A condition, where the magnitude of the initial rotation speed of the electric motor exceeds a second threshold but does not exceed a first threshold; and the direction of the initial rotation speed is a forward direction, indicates that the electric motor is of the forward direction of the initial rotation speed and has a less high initial rotation speed, it is then determined that the electric motor is in a weak tailwind state before starting, thus entering the low-speed forward-direction start mode. For the low-speed forward-direction start mode, it is first switching from the detection state to the OpenLoop state, to establish a reliable counter-electromotive force (at this time, the estimated rotation speed of the electric motor is reliable and smooth); and thus at this time switching from the OpenLoop state to the CloseLoop state.

In specific, the low-speed reverse-direction start mode differs from the low-speed forward-direction start mode in that the low-speed reverse-direction start mode requires the rotation speed passing through zero, however such a process transitions automatically after a target rotation speed has been set, thus does not involve state switch. Thus, for both the low-speed reverse-direction start mode and the low-speed forward-direction start mode, the involved scheme of switching the rotation speed control state is always the CatchSpin state→the OpenLoop state→the CloseLoop state.

It should be noted that in both the low-speed reverse-direction start mode and the low-speed forward-direction start mode, the current loop is the close-loop state.

The above switching scheme achieves, in the low-speed reverse-direction start mode and the low-speed forward-direction start mode, establishing the reliable counter-electromotive force, and then finally switching to the CloseLoop state, thus guaranteeing the sensorless FOC PMSM to start reliably and smoothly, without cost increased, improving the starting performance of the PMSM, thereby expanding application scenarios of the Sensorless FOC PMSM control system.

In any of the above embodiments, determining the target start mode for the electric motor according to the initial rotation speed and the initial rotation speed direction includes: in response to the initial rotation speed being lower than a second threshold, and the initial rotation speed direction being a reverse direction or a forward direction, determining the target start mode to be a static start mode, wherein the scheme of switching the rotation speed control state corresponding to the static start mode is: switching from a detection state to a direct-current positioning state, then switching from the direct-current positioning state to a rotation speed open-loop state, and then switching from the rotation speed open-loop state to a rotation speed close-loop state.

In this technical solution, a condition, where the magnitude of the initial rotation speed of the electric motor does not exceed a second threshold; and the direction of the initial rotation speed of the electric motor is either a reverse direction or a forward direction, indicates that the electric motor has a very low initial rotation speed or has no initial rotation speed, it is then determined that the electric motor is in a static state, thus entering the static start mode.

For the static start mode, it is firstly switching from the detection state to a direct-current positioning (DC) state; then switching from the DC state to an OpenLoop state, to establish a reliable counter-electromotive force (at this time, the estimated rotation speed of the electric motor is reliable and smooth); and thus at this time switching from the OpenLoop state to a CloseLoop state. That is, the involved scheme of switching the rotation speed control state is: the CatchSpin state→the DC state→the OpenLoop state→the CloseLoop state.

It should be noted that in the static start mode, the current loop is the close-loop state; the DC state refers to a state where the rotation speed of the electric motor is equal to zero.

The above switching scheme achieves, in the static start mode, establishing the reliable counter-electromotive force, and then finally switching to the CloseLoop state, thus guaranteeing the sensorless FOC PMSM to start reliably and smoothly, without cost increased, improving the starting performance of the PMSM, thereby expanding application scenarios of the Sensorless FOC PMSM control system.

In any of the above embodiments, determining the target start mode for the electric motor according to the initial rotation speed and the initial rotation speed direction includes: in response to the initial rotation speed being greater than a first threshold and the initial rotation speed direction being a forward direction, determining the target start mode to be a high-speed forward-direction start mode, wherein the scheme of switching the rotation speed control state corresponding to the high-speed forward-direction start mode is: switching from a detection state to a rotation speed close-loop state.

In this technical solution, a condition, where the magnitude of the initial rotation speed of the electric motor exceeds a first threshold and the direction of the initial rotation speed of the electric motor is a forward direction, indicates that the electric motor is of the forward direction of the initial rotation speed and has the very high initial rotation speed, it is then determined that the electric motor is in a high-speed tailwind state before starting, thus entering the high-speed forward-direction start mode.

For the high-speed forward-direction start mode, as the reliable counter-electromotive force has been established, it is directly switching from the CatchSpin state to the CloseLoop state. In the high-speed forward-direction start mode, the involved scheme of switching the rotation speed control state is: the CatchSpin state→the CloseLoop state.

It should be noted that in the high-speed forward-direction start mode, the current loop is the close-loop state.

The above switching scheme, in the high-speed forward-direction start mode, guarantees the sensorless FOC PMSM to start reliably and smoothly, without cost increased, improving the starting performance of the PMSM, thereby expanding application scenarios of the Sensorless FOC PMSM control system.

In any of the above embodiments, the control method further includes: converting a first coordinate system in a first rotation speed control state to a second coordinate system in a second rotation speed control state in the process of switching from the first rotation speed control state to the second rotation speed control state.

For the sensorless FOC PMSM control system, upon starting, the existing control method in the related art generally fixes by positioning the PMSM at an initial position, drives the PMSM to a certain rotation speed by means of current close-loop and rotation speed open-loop, to establish the reliable counter-electromotive force, and then forcibly switches to rotation speed close-loop. By the reason that before and after switching from the rotation speed open-loop to the close-loop, an actual rotation speed and angle of the electric motor is not necessarily identical to an estimated rotation speed and angle used when switching to the close-loop, resulting in loss of synchronism for the electric motor in the process of switching. A slight loss of synchronism may be adjusted back subsequently; while a severe loss of synchronism will cause a failure of switching from the open-loop to the close-loop, thus leading to start failure of the electric motor. To improve success of the start, the electric motor is usually restarted through a second start, however this does not completely avoid the problem of start failure of the electric motor due to the loss of synchronism for the electric motor in the process of switching from the open-loop to the close-loop from a mechanistic perspective.

To enable the PMSM electric motor to start smoothly, it is necessary to ensure seamless connection between various states upon switching. This requires that no sudden change occurs for a current, a voltage, an angle, and an initial value of an integral term of the involved PI controller of a PMSM vector control system in the rotation coordinate system; and it is necessary to consider smooth transition of these physical quantities upon switching between different states, so that finally the PMSM electric motor can be ensured to start smoothly.

In view of this, embodiments of the present disclosure direct to the defect of the control method in the related art, in the process of starting the electric motor, the first coordinate system in the first rotation speed control state and the second coordinate system in the second rotation speed control state are established respectively, upon switching from the first rotation speed control state to the second rotation speed control state for the electric motor, the first coordinate system is projected to the second coordinate system, which fundamentally solves the problem of loss of synchronism for the electric motor in the process of the PMSM electric motor switching, thus enabling the PMSM to start smoothly and reliably.

It should be noted that the first rotation speed control state is one of the CloseLoop state and the OpenLoop state; and the second rotation speed control state is the other one of the CloseLoop state and the OpenLoop state. That is, when the first rotation speed control state is the CloseLoop state, the second rotation speed control state is the OpenLoop state;

while when the first rotation speed control state is the OpenLoop state, the second rotation speed control state is the CloseLoop state.

Illustratively, a dq open-loop rotation coordinate system and a dq close-loop rotation coordinate system are established respectively; when the electric motor is controlled to switch from the OpenLoop state to the CloseLoop state, the dq open-loop rotation coordinate system is projected to the dq close-loop rotation coordinate system; alternatively, when the electric motor is controlled to switch from the CloseLoop state to the OpenLoop state, the dq close-loop rotation coordinate system is projected to the dq open-loop rotation coordinate system.

In another aspect, the present disclosure provides in embodiments a control apparatus for an electric motor, includes: an acquiring module, configured to acquire an initial rotation speed and an initial rotation speed direction of the electric motor; a determining module, configured to determine a target start mode for the electric motor according to the initial rotation speed and the initial rotation speed direction; and a control module, configured to control the electric motor to start in accordance with the target start mode.

In this technical solution, for guaranteeing the electric motor to start smoothly under various circumstances, various initial rotation speeds and various initial rotation speed directions of the electric motor are taken into consideration for the smooth start. In specific, several preset start modes are set in advance, where different initial rotation speeds and different initial rotation speed directions correspond to different start modes, and different start modes in turn decide different start schemes at a start stage of the electric motor.

The initial rotation speed and the initial rotation speed direction are identified in the detection state; the target start mode corresponding to the initial rotation speed and the initial rotation speed direction are determined in several preset start modes, according to the initial rotation speed and the initial rotation speed direction identified in the detection state; and the electric motor is controlled to enter the start stage according to the target start mode.

It should be noted that the electric motor as describe above is the PMSM, applicable to both a built-in permanent magnet synchronous machine and a surface permanent magnet synchronous machine, and particularly is the Sensorless FOC PMSM.

According to embodiments of the present disclosure, the control method can determine an optimal target start mode for the initial rotation speed and the initial rotation speed direction of the electric motor among several preset start modes, thus controlling the electric motor to start. According to embodiments of the present disclosure, the control method can guarantee the sensorless FOC PMSM to start reliably and smoothly under various rotation speed conditions.

Besides, due to consideration of the initial rotation speed before starting, a process of detecting a magnitude and a direction of the initial rotation speed is also referred to a CatchSpin state in embodiments of the present disclosure. In other words, in embodiments of the present disclosure, the initial rotation speed and the initial rotation speed direction of the electric motor are estimated in the CatchSpin state (also referred to as "a detection state"). Accordingly, the present disclosure also provides in embodiments a control method for the electric motor, switching from the CatchSpin state to a start state smoothly.

According to embodiments of the present disclosure, the control apparatus for the electric motor may further have the following additional features.

In the above technical solution, the determining module is further configured to determine a scheme of switching a rotation speed control state corresponding to the target start mode; and the control module is specifically configured to control the electric motor to start in accordance with the scheme of switching the rotation speed control state.

In this technical solution, several preset start modes include: a high-speed reverse-direction start mode, a low-speed reverse-direction start mode, a static start mode, a low-speed forward-direction start mode, and a high-speed forward-direction start mode. In a process of controlling the electric motor to start, based on that the electric motor starts with the initial rotation speed, in an embodiment of the present disclosure, according to the magnitude and the direction of the initial rotation speed, starting of the Sensorless FOC PMSM control system is classified into five start modes, i.e., the high-speed reverse-direction start mode, the low-speed reverse-direction start mode, the static start mode, the low-speed forward-direction start mode, and the high-speed forward-direction start mode, which cover all circumstances for the electric motor starting, guaranteeing a starting effect of the electric motor under various start conditions.

The target start mode is determined from several preset start modes according to the initial rotation speed and the initial rotation speed direction identified in the detection state; the electric motor is in turn controlled to start according to a start scheme corresponding to the target start mode. It should be noted that the start scheme is the scheme of switching the rotation speed control state.

In embodiments of the present disclosure, the control method takes all circumstances under which the electric motor starts, enabling the electric motor to start in accordance with the start scheme meeting the magnitude and the direction of the initial rotation speed, thus improving the reliability and smoothness for starting the electric motor, and guaranteeing the starting effect of the electric motor under various start conditions.

In any of the above embodiments, the determining module is specifically configured to: in response to the initial rotation speed being greater than a first threshold and the initial rotation speed direction being a reverse direction, determine the target start mode to be a high-speed reverse-direction start mode, wherein the scheme of switching the rotation speed control state corresponding to the high-speed reverse-direction start mode is: switching from a detection state to a rotation speed close-loop state, then switching from the rotation speed close-loop state to a rotation speed open-loop state, and then switching from the rotation speed open-loop state to the rotation speed close-loop state.

In this technical solution, a condition, where the magnitude of the initial rotation speed of the electric motor exceeds a first threshold and the direction of the initial rotation speed of the electric motor is a reverse direction, indicates that the electric motor is of the reverse direction of the initial rotation speed and has a very high initial rotation speed, it is then determined that the electric motor is in the high-speed headwind state before starting, thus entering the high-speed reverse-direction start mode.

For the high-speed reverse-direction start mode, it is firstly switching from the CatchSpin state to a rotation speed close-loop (CloseLoop) state; then switching from the CloseLoop state to a rotation speed open-loop (OpenLoop) state, to establish a reliable counter-electromotive force (at this time, the estimated rotation speed of the electric motor is reliable and smooth); and thus at this time switching from the OpenLoop state to the CloseLoop state. That is, the involved scheme of switching the rotation speed control state is: the detection state→the CloseLoop state→the OpenLoop state→the CloseLoop state.

It should be noted that in the high-speed reverse-direction start mode, a current loop is a close-loop state. The purpose of switching from the CatchSpin state to the CloseLoop state is to more effectively decelerate and then switch from the CloseLoop state to the OpenLoop state when the rotation speed is inaccurate.

The above switching scheme achieves, in the high-speed reverse-direction start mode, establishing the reliable counter-electromotive force, and then finally switching to the CloseLoop state, thus guaranteeing the sensorless FOC PMSM to start reliably and smoothly, without cost increased, improving starting performance of the PMSM, thereby expanding application scenarios of the Sensorless FOC PMSM control system.

In any of the above embodiments, the determining module is specifically configured to: in response to the initial rotation speed being greater than or equal to a second threshold and lower than or equal to a first threshold, and the initial rotation speed direction being a reverse direction or a forward direction, determine the target start mode to be a low-speed start mode, wherein the scheme of switching the rotation speed control state corresponding to the low-speed start mode is: switching from a detection state to a rotation speed open-loop state, and then switching from the rotation speed open-loop state to a rotation speed close-loop state, wherein the first threshold is greater than the second threshold.

In this technical solution, the low-speed start mode includes a low-speed reverse-direction start mode and a low-speed forward-direction start mode.

A condition, where the magnitude of the initial rotation speed of the electric motor exceeds a second threshold but does not exceed a first threshold; and the direction of the initial rotation speed is a reverse direction, indicates that the electric motor is of the reverse direction of the initial rotation speed and has a less high initial rotation speed, it is then determined that the electric motor is in a weak headwind state before starting, thus entering the low-speed reverse-direction start mode. For the low-speed reverse-direction start mode, it is first switching from the detection state to the OpenLoop state, to establish a reliable counter-electromotive force (at this time, the estimated rotation speed of the electric motor is reliable and smooth); and thus at this time switching from the OpenLoop state to the CloseLoop state.

A condition, where the magnitude of the initial rotation speed of the electric motor exceeds a second threshold but does not exceed a first threshold; and the direction of the initial rotation speed is a forward direction, indicates that the electric motor is of the forward direction of the initial rotation speed and has a less high initial rotation speed, it is then determined that the electric motor is in a weak tailwind state before starting, thus entering the low-speed forward-direction start mode. For the low-speed forward-direction start mode, it is first switching from the detection state to the OpenLoop state, to establish a reliable counter-electromotive force (at this time, the estimated rotation speed of the electric motor is reliable and smooth); and thus at this time switching from the OpenLoop state to the CloseLoop state.

In specific, the low-speed reverse-direction start mode differs from the low-speed forward-direction start mode in that the low-speed reverse-direction start mode requires the rotation speed passing through zero, however such a process transitions automatically after a target rotation speed has been set, thus does not involve state switch. Thus, for both the low-speed reverse-direction start mode and the low-speed forward-direction start mode, the involved scheme of switching the rotation speed control state is always the CatchSpin state→the OpenLoop state→the CloseLoop state.

It should be noted that in both the low-speed reverse-direction start mode and the low-speed forward-direction start mode, the current loop is the close-loop state.

The above switching scheme achieves, in the low-speed reverse-direction start mode and the low-speed forward-direction start mode, establishing the reliable counter-electromotive force, and then finally switching to the CloseLoop state, thus guaranteeing the sensorless FOC PMSM to start reliably and smoothly, without cost increased, improving the starting performance of the PMSM, thereby expanding application scenarios of the Sensorless FOC PMSM control system.

In any of the above embodiments, the determining module is specifically configured to: in response to the initial rotation speed being lower than a second threshold, and the initial rotation speed direction being a reverse direction or a forward direction, determine the target start mode to be a static start mode, wherein the scheme of switching the rotation speed control state corresponding to the static start mode is: switching from a detection state to a direct-current positioning state, then switching from the direct-current positioning state to a rotation speed open-loop state, and then switching from the rotation speed open-loop state to a rotation speed close-loop state.

In this technical solution, a condition, where the magnitude of the initial rotation speed of the electric motor does not exceed a second threshold; and the direction of the initial rotation speed of the electric motor is either a reverse direction or a forward direction, indicates that the electric motor has a very low initial rotation speed or has no initial rotation speed, it is then determined that the electric motor is in a static state, thus entering the static start mode.

For the static start mode, it is firstly switching from the detection state to a direct-current positioning (DC) state; then switching from the DC state to an OpenLoop state, to establish a reliable counter-electromotive force (at this time, the estimated rotation speed of the electric motor is reliable and smooth); and thus at this time switching from the OpenLoop state to a CloseLoop state. That is, the involved scheme of switching the rotation speed control state is: the CatchSpin state→the DC state→the OpenLoop state→the CloseLoop state.

It should be noted that in the static start mode, the current loop is the close-loop state; the DC state refers to a state where the rotation speed of the electric motor is equal to zero.

The above switching scheme achieves, in the static start mode, establishing the reliable counter-electromotive force, and then finally switching to the CloseLoop state, thus guaranteeing the sensorless FOC PMSM to start reliably and smoothly, without cost increased, improving the starting performance of the PMSM, thereby expanding application scenarios of the Sensorless FOC PMSM control system.

In any of the above embodiments, the determining module is specifically configured to: in response to the initial rotation speed being greater than a first threshold and the initial rotation speed direction being a forward direction, determine the target start mode to be a high-speed forward-direction start mode, wherein the scheme of switching the rotation speed control state corresponding to the high-speed forward-direction start mode is: switching from a detection state to a rotation speed close-loop state.

In this technical solution, a condition, where the magnitude of the initial rotation speed of the electric motor exceeds a first threshold and the direction of the initial rotation speed of the electric motor is a forward direction, indicates that the electric motor is of the forward direction of the initial rotation speed and has the very high initial rotation speed, it is then determined that the electric motor is in a high-speed tailwind state before starting, thus entering the high-speed forward-direction start mode.

For the high-speed forward-direction start mode, as the reliable counter-electromotive force has been established, it is directly switching from the CatchSpin state to the CloseLoop state. In the high-speed forward-direction start mode, the involved scheme of switching the rotation speed control state is: the CatchSpin state→the CloseLoop state.

It should be noted that in the high-speed forward-direction start mode, the current loop is the close-loop state.

The above switching scheme, in the high-speed forward-direction start mode, guarantees the sensorless FOC PMSM to start reliably and smoothly, without cost increased, improving the starting performance of the PMSM, thereby expanding application scenarios of the Sensorless FOC PMSM control system.

In any of the above embodiments, the control module is further configured to: convert a first coordinate system in a first rotation speed control state to a second coordinate system in a second rotation speed control state in the process of switching from the first rotation speed control state to the second rotation speed control state.

In this technical solution, for the sensorless FOC PMSM control system, upon starting, the existing control method in the related art generally fixes by positioning the PMSM at an initial position, drives the PMSM to a certain rotation speed by means of current close-loop and rotation speed open-loop, to establish the reliable counter-electromotive force, and then forcibly switches to rotation speed close-loop. By the reason that before and after switching from the rotation speed open-loop to the close-loop, an actual rotation speed and angle of the electric motor is not necessarily identical to an estimated rotation speed and angle used when switching to the close-loop, resulting in loss of synchronism for the electric motor in the process of switching. A slight loss of synchronism may be adjusted back subsequently; while a severe loss of synchronism will cause a failure of switching from the open-loop to the close-loop, thus leading to start failure of the electric motor. To improve success of the start, the electric motor is usually restarted through a second start, however this does not completely avoid the problem of start failure of the electric motor due to the loss of synchronism for the electric motor in the process of switching from the open-loop to the close-loop from a mechanistic perspective.

To enable the PMSM electric motor to start smoothly, it is necessary to ensure seamless connection between various states upon switching. This requires that no sudden change occurs for a current, a voltage, an angle, and an initial value of an integral term of the involved PI controller of a PMSM vector control system in the rotation coordinate system; and it is necessary to consider smooth transition of these physical quantities upon switching between different states, so that finally the PMSM electric motor can be ensured to start smoothly.

In view of this, embodiments of the present disclosure direct to the defect of the control method in the related art, in the process of starting the electric motor, the first coordinate system in the first rotation speed control state and the second coordinate system in the second rotation speed control state are established respectively, upon switching from the first rotation speed control state to the second rotation speed control state for the electric motor, the first coordinate system is projected to the second coordinate system, which fundamentally solves the problem of loss of synchronism for the electric motor in the process of the PMSM electric motor switching, thus enabling the PMSM to start smoothly and reliably.

It should be noted that the first rotation speed control state is one of the CloseLoop state and the OpenLoop state; and the second rotation speed control state is the other one of the CloseLoop state and the OpenLoop state. That is, when the first rotation speed control state is the CloseLoop state, the second rotation speed control state is the OpenLoop state; while when the first rotation speed control state is the OpenLoop state, the second rotation speed control state is the CloseLoop state.

Illustratively, a dq open-loop rotation coordinate system and a dq close-loop rotation coordinate system are established respectively; when the electric motor is controlled to switch from the OpenLoop state to the CloseLoop state, the dq open-loop rotation coordinate system is projected to the dq close-loop rotation coordinate system; alternatively, when the electric motor is controlled to switch from the CloseLoop state to the OpenLoop state, the dq close-loop rotation coordinate system is projected to the dq open-loop rotation coordinate system.

In still another aspect, the present disclosure provides in embodiments a control system for an electric motor, including: the electric motor; a memory, having stored with a program or instruction; and a processor that, when executing the program or instruction, achieves steps of a control method for an electric motor as described in any of the above embodiments.

According to embodiments of the present disclosure, the control system for the electric motor, when the program or instruction is executed by a processor, implements steps of the control method for the electric motor as described in any of the above embodiments. Thus, the control system for the electric motor has all advantages of the control method for the electric motor as described in any of the above embodiments.

In yet another aspect, the present disclosure provides in embodiments a control system for an electric motor, including: the electric motor; and a control apparatus for an electric motor as described in any of the above embodiments.

According to embodiments of the present disclosure, the control system for the electric motor includes the electric motor; and the control apparatus for the electric motor as described in any of the above embodiments. Thus, the control system for the electric motor has all advantages of the control apparatus for the electric motor as described in any of the above embodiments.

In still another aspect, the present disclosure provides in embodiments a computer-readable storage medium, having stored thereon a program or instruction that, when executed by a processor, implements steps of a control method for an electric motor as described in any of the above embodiments.

According to embodiments of the present disclosure, the computer-readable storage medium, when the program or instruction is executed by the processor, implements steps of the control method for the electric motor as described in any of the above embodiments. Thus, the computer-readable storage medium has all advantages of the control method for the electric motor as described in any of the above embodiments.

In still another aspect, the present disclosure provides in embodiments an air conditioner, including: a control apparatus for an electric motor as described in any of the above embodiments; or a control system for an electric motor as described in any of the above embodiments; or a computer-readable storage medium as described in any of the above embodiments.

According to embodiments of the present disclosure, in one embodiment, the air conditioner includes the control apparatus for the electric motor as described in any of the above embodiments, thus the air conditioner has all advantages of the control apparatus for the electric motor as described in any of the above embodiments; alternatively, in one embodiment, the air conditioner includes the control system for the electric motor as described in any of the above embodiments, thus the air conditioner has all advantages of the control system for the electric motor as described in any of the above embodiments; alternatively, in one embodiment, the air conditioner includes the computer-readable storage medium as described in any of the above embodiments, thus the air conditioner has all advantages of the computer-readable storage medium as described in any of the above embodiments.

The additional aspects and advantages of the present disclosure will be partially provided in the following description, which will become apparent from the following description or learned through the practice of the present disclosure.

BRIEF DESCRIPTION OF THE DRAWINGS

The additional aspects and advantages of the present disclosure will be partially provided in the following description, which will become apparent from the following description or learned through the practice of the present disclosure, in which.

Figure 1:
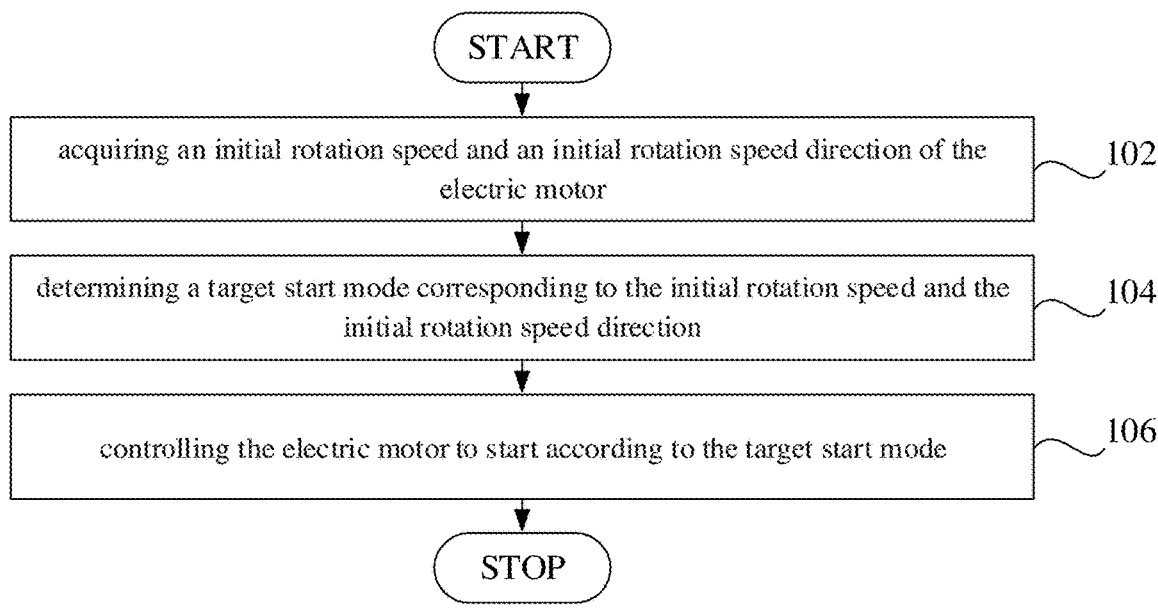
FIG. 1 is a flow chart showing a control method for an electric motor in an embodiment of the present disclosure.

Correspondence between the reference signs in FIGS. 8-11 and the part names is given below.

800: a control apparatus for an electric motor; 802: an acquiring module; 804: a determining module; 806: a control module; 900, 910, 920: an air conditioner; 700: a control system for an electric motor; 600: a computer-readable storage medium

DETAILED DESCRIPTION

The following will provide a clear and complete description of the technical solution in embodiments of the present disclosure in conjunction with the accompanying drawings. Obviously, the described embodiments are only part embodiments of the present disclosure, rather than all embodiments of the present disclosure. Based on the embodiments in the present disclosure, all other embodiments obtained by ordinary technical personnel in the art without creative labor fall within the protection scope of the present disclosure.

It should be noted that all directional indications (such as up, down, left, right, front, rear . . . ) in embodiments of the present disclosure are only used to explain a relative position relationship, motion situation, etc. between components in a specific posture (as shown in the accompanying drawings). If the specific posture changes, the directional indication also changes accordingly.

In addition, terms such as "first" and "second" involved in the present disclosure are for purposes of description and are not intended to indicate or imply relative importance or significance or impliedly indicate quantity of the technical feature referred to. Thus, the feature defined with "first" and "second" may comprise one or more this feature. In the description of the disclosure, "a plurality of/several" means at least two, for example, two or three, unless specified otherwise.

In the present disclosure, unless specified or limited otherwise, the term "connected" and "fixed" and the like are used broadly, and may be, for example, fixed connections, detachable connections, or integrated connections; may also be mechanical or electrical connections; may also be direct connections or indirect connections via intervening structures; may also be inner communications of two elements or mutual interaction between two elements, which can be understood by those skilled in the art according to specific situations.

In addition, the technical solutions between the various embodiments of the present disclosure can be combined with each other, on the premise of being implementable by ordinary technical personnel in the art. When the technical solutions combined conflicts or is non-implementable, it should be considered that combination of such technical solutions does not exist and is not within the protection scope claimed by the present disclosure.

In conjunction with the accompanying drawings, a control method for an electric motor, a control apparatus for an electric motor, a control system for an electric motor, a computer-readable storage medium, and an air conditioner according to embodiments of the present disclosure are illustrated in details below through specific embodiments through specific embodiments and application scenarios.

In some embodiments of the present disclosure, there is provided a control apparatus for an electric motor. FIG. 1 is a flow chart showing a control method for an electric motor in an embodiment of the present disclosure. In specific, the control method includes steps 102 to 106.

At step 102, an initial rotation speed and an initial rotation speed direction of the electric motor are acquired.

At step 104, a target start mode for the electric motor according to the initial rotation speed and the initial rotation speed direction is determined.

At step 106, the electric motor is controlled to start in accordance with the target start mode In this technical solution, for guaranteeing the electric motor to start smoothly under various circumstances, various initial rotation speeds and various initial rotation speed directions of the electric motor are taken into consideration for the smooth start. In specific, several preset start modes are set in advance, where different initial rotation speeds and different initial rotation speed directions correspond to different start modes, and different start modes in turn decide different start schemes at a start stage of the electric motor.

The initial rotation speed and the initial rotation speed direction are identified in the detection state; the target start mode corresponding to the initial rotation speed and the initial rotation speed direction are determined in several preset start modes, according to the initial rotation speed and the initial rotation speed direction identified in the detection state; and the electric motor is controlled to enter the start stage according to the target start mode.

It should be noted that the electric motor as describe above is the PMSM, applicable to both a built-in permanent magnet synchronous machine and a surface permanent magnet synchronous machine, and particularly is the Sensorless FOC PMSM.

According to embodiments of the present disclosure, the control method can determine an optimal target start mode for the initial rotation speed and the initial rotation speed direction of the electric motor among several preset start modes, thus controlling the electric motor to start. According to embodiments of the present disclosure, the control method can guarantee the sensorless FOC PMSM to start reliably and smoothly under various rotation speed conditions.

Besides, due to consideration of the initial rotation speed before starting, a process of detecting a magnitude and a direction of the initial rotation speed is also referred to a CatchSpin state in embodiments of the present disclosure. In other words, in embodiments of the present disclosure, the initial rotation speed and the initial rotation speed direction of the electric motor are estimated in the CatchSpin state (also referred to as "a detection state"). Accordingly, the present disclosure also provides in embodiments a control method for the electric motor, switching from the CatchSpin state to a start state smoothly.

In some embodiments of the present disclosure, the step of controlling the electric motor to start in accordance with the target start mode specifically includes: determining a scheme of switching a rotation speed control state corresponding to the target start mode; and controlling the electric motor to start in accordance with the scheme of switching the rotation speed control state.

Figure 2:
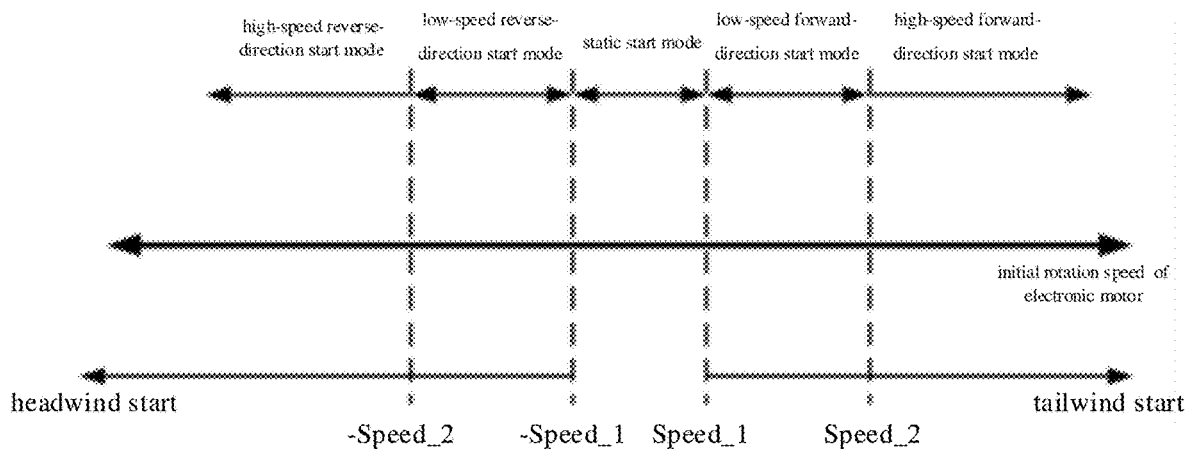
FIG. 2 is a schematic diagram showing five start modes classified by an initial rotation speed of PMSM in an embodiment of the present disclosure.

In this technical solution, several preset start modes include: a high-speed reverse-direction start mode, a low-speed reverse-direction start mode, a static start mode, a low-speed forward-direction start mode, and a high-speed forward-direction start mode. In a process of controlling the electric motor to start, based on that the electric motor starts with the initial rotation speed, in an embodiment of the present disclosure as shown in FIG. 2, according to the magnitude and the direction of the initial rotation speed, starting of the Sensorless FOC PMSM control system is classified into five start modes, i.e., the high-speed reverse-direction start mode, the low-speed reverse-direction start mode, the static start mode, the low-speed forward-direction start mode, and the high-speed forward-direction start mode. In specific, the high-speed reverse-direction start mode are the low-speed reverse-direction start mode each are the headwind start; while the low-speed forward-direction start mode and the high-speed forward-direction start mode each are the tailwind start. The above cover all circumstances for the electric motor starting, guaranteeing a starting effect of the electric motor under various start conditions.

The PMSM electric motor is provided with five start modes in accordance with the initial rotation speed. As shown in FIG. 2, "Speed_2" indicates a sufficient counter-electromotive force has been established for the electric motor, at this time the estimated rotation speed is reliable and smooth, thus "Speed_2" is a rotation speed threshold for a rotation speed close-loop control (i.e., the first threshold). "Speed_1" is a rotation speed threshold where the electric motor is nearly static (i.e., the second threshold), with a value generally set at 30 rpm or below. Meantime, in all start modes, the current loop is under a close-loop control.

Detection of an initial state of the electric motor by a CatchSpin algorithm (before the electric motor starts) includes detection of the initial rotation speed, the initial rotation speed direction and the initial position of the electric motor, for determination on which target start mode is entered upon the PMSM electric motor starting; and the electric motor is in turn controlled to start according to a start scheme corresponding to the target start mode. It should be noted that the start scheme is the scheme of switching the rotation speed control state.

In embodiments of the present disclosure, the control method takes all circumstances under which the electric motor starts, enabling the electric motor to start in accordance with the start scheme meeting the magnitude and the direction of the initial rotation speed, thus improving the reliability and smoothness for starting the electric motor, and guaranteeing the starting effect of the electric motor under various start conditions.

Figure 3:
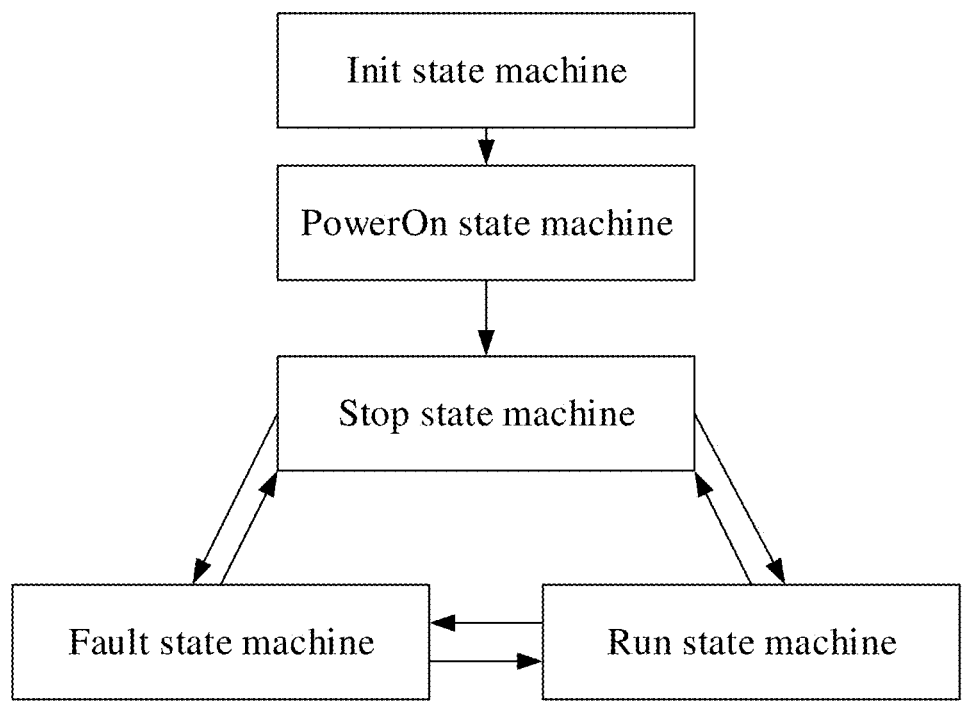
FIG. 3 is a schematic diagram showing state machines for starting the electric motor corresponding to five start modes classified by an initial rotation speed of PMSM in an embodiment of the present disclosure.
Figure 4:
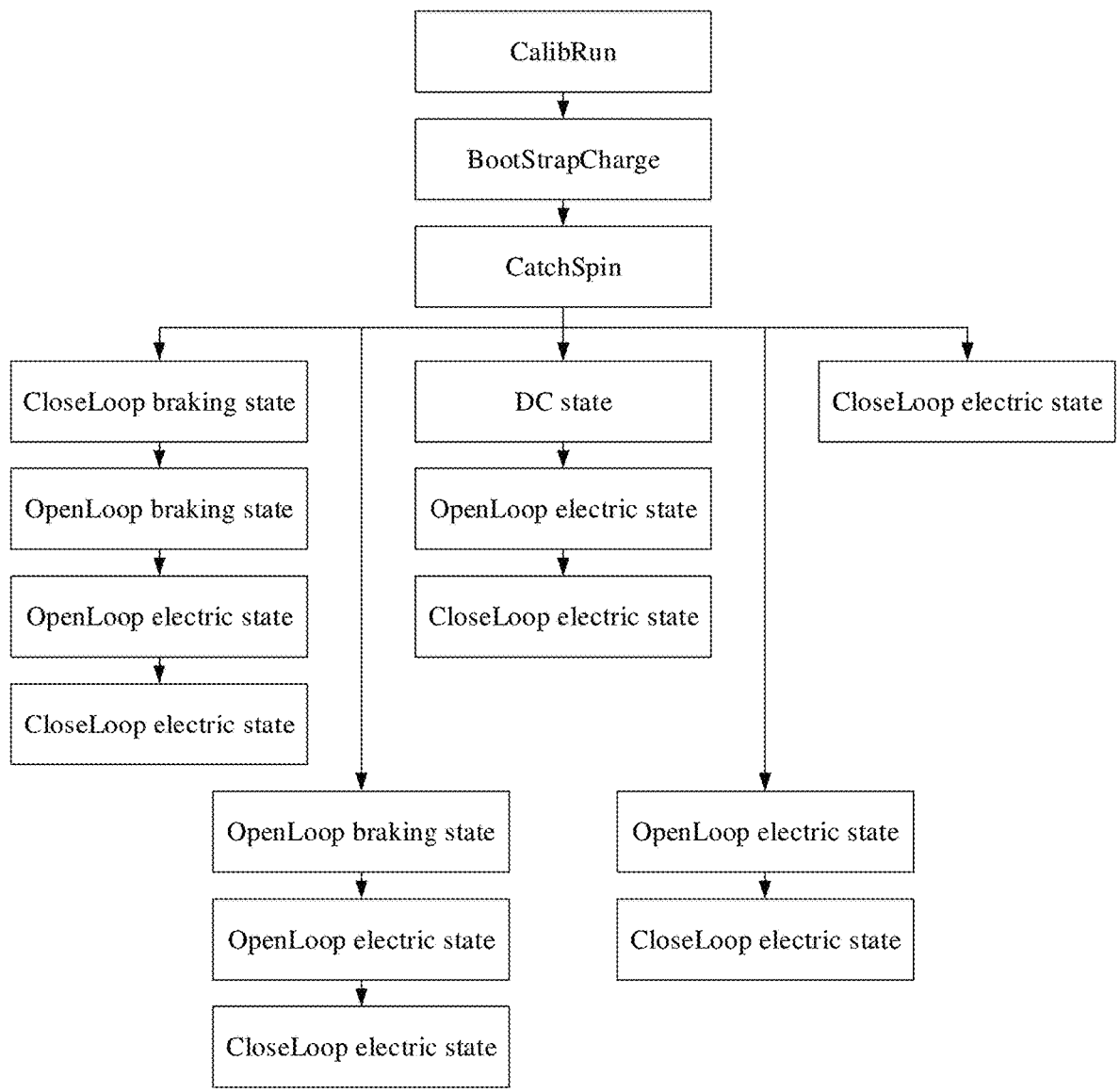
FIG. 4 is another flow chart showing a control method for an electric motor in an embodiment of the present disclosure.

FIG. 3 is a schematic diagram showing state machines for starting the electric motor corresponding to five start modes classified by an initial rotation speed of PMSM in an embodiment of the present disclosure. In specific, once a control chip of the Sensorless FOC PMSM control system is powered on and begins operation, a program first enters an initialization (Init) state machine; and then enters a PowerOn state machine where a relay is energized; and afterwards, switches between a Stop state machine, a Fault state machine, and a Run state machine in accordance with a system state. Upon receiving a rotation speed instruction signal, as shown in FIG. 4, the electric motor enters the Run state machine, firstly performing a CalibRun state machine for AD sampling calibration; entering a bootstrap charging (BootStrapCharge) state machine after the AD sampling calibration is completed; then entering a CatchSpin state machine for detection of the initial state (i.e., the magnitude and the direction of the initial rotation speed, and the initial position) of the PMSM; and finally entering five start modes respectively according to the initial state detected of the electric motor.

In some embodiments of the present disclosure, the step of determining the target start mode corresponding to the initial rotation speed and the initial rotation speed direction specifically includes: when judging that the initial rotation speed is greater than a first threshold and the initial rotation speed direction is a reverse direction, determining the target start mode corresponding to the initial rotation speed and the initial rotation speed direction to be a high-speed reverse-direction start mode.

The scheme of switching the rotation speed control state in the high-speed reverse-direction start mode is set in advance as: switching from a CatchSpin state to a CloseLoop (rotation speed close-loop) state, then switching from the CloseLoop state to an OpenLoop (rotation speed open-loop) state, and then switching from the OpenLoop state to the CloseLoop state.

In this technical solution, a condition, where the magnitude of the initial rotation speed of the electric motor exceeds a first threshold and the direction of the initial rotation speed of the electric motor is a reverse direction, indicates that the electric motor is of the reverse direction of the initial rotation speed and has a very high initial rotation speed, it is then determined that the electric motor is in the high-speed headwind state before starting, thus entering the high-speed reverse-direction start mode.

For the high-speed reverse-direction start mode, it is firstly switching from the CatchSpin state to the CloseLoop state; then switching from the CloseLoop state to the OpenLoop state, to establish a reliable counter-electromotive force (at this time, the estimated rotation speed of the electric motor is reliable and smooth); and thus at this time switching from the OpenLoop state to the CloseLoop state. That is, the involved scheme of switching the rotation speed control state is: the detection state→the CloseLoop state→the OpenLoop state→the CloseLoop state.

It should be noted that in the high-speed reverse-direction start mode, the current loop is the close-loop state. The purpose of switching from the CatchSpin state to the CloseLoop state is to more effectively decelerate. As the Sensorless FOC PMSM control system is of a very low counter-electromotive force at a low rotation speed, the estimated rotation speed at this time is considered unreliable. Therefore, in response to the low rotation speed, it is necessary to drive to a certain rotation speed through the rotation speed open-loop, to establish the reliable counter-electromotive force before the rotation speed close-loop control.

Illustratively, as shown in FIGS. 2 and 4, when the initial rotation speed of the PMSM electric motor is detected by the CatchSpin algorithm to be in a reverse direction and to be very high (i.e., "Speed" is lower than "–Speed_2"), it is determined that the electric motor is in the high-speed headwind state before starting, thus entering the high-speed reverse-direction start mode. It is firstly switching from a CatchSpin state to a CloseLoop braking state; when the rotation speed of the electric motor is braked to "–Speed_2", then switching from the CloseLoop braking state to an OpenLoop braking state; when the rotation speed of the electric motor is braked to "–Speed_1", where it is determined that the electric motor has been braked to stop due to a very low rotation speed threshold set for "Speed_1", and then switching from the OpenLoop braking state to an OpenLoop electric state; and when the rotation speed of the electric motor reaches "Speed_2" with the forward direction, it is determined that the sufficient counter-electromotive force has been established for the electric motor, thus entering a CloseLoop electric state.

The above switching scheme achieves, in the high-speed reverse-direction start mode, establishing the reliable counter-electromotive force, and then finally switching to the CloseLoop state, thus guaranteeing the sensorless FOC PMSM to start reliably and smoothly, without cost increased, improving starting performance of the PMSM, thereby expanding application scenarios of the Sensorless FOC PMSM control system.

In some embodiments of the present disclosure, the step of determining the target start mode corresponding to the initial rotation speed and the initial rotation speed direction specifically includes: when judging that the initial rotation speed is greater than or equal to a second threshold and lower than or equal to a first threshold, and the initial rotation speed direction is a reverse direction, determining the target start mode corresponding to the initial rotation speed and the initial rotation speed direction to be a low-speed reverse-direction start mode, wherein the first threshold is greater than the second threshold.

The scheme of switching the rotation speed control state in the low-speed reverse-direction start mode is set in advance as: switching from a CatchSpin state to an OpenLoop state, and then switching from the OpenLoop state to a CloseLoop state.

In this technical solution, a condition, where the magnitude of the initial rotation speed of the electric motor exceeds a second threshold but does not exceed a first threshold; and the direction of the initial rotation speed is a reverse direction, indicates that the electric motor is of the reverse direction of the initial rotation speed and has a less high initial rotation speed, it is then determined that the electric motor is in a weak headwind state before starting, thus entering the low-speed reverse-direction start mode. For the low-speed reverse-direction start mode, it is first switching from the detection state to the OpenLoop state, to establish a reliable counter-electromotive force (at this time, the estimated rotation speed of the electric motor is reliable and smooth); and thus at this time switching from the OpenLoop state to the CloseLoop state.

It should be noted that in the low-speed reverse-direction start mode, the current loop is the close-loop state.

Illustratively, as shown in FIGS. 2 and 4, when the initial rotation speed of the PMSM electric motor is detected by the CatchSpin algorithm to be in a reverse direction and to be less high (i.e., "Speed" is greater than or equal to "–Speed_2", and lower than or equal to "–Speed_1"), it is determined that the electric motor is in the weak headwind state before starting, thus entering the low-speed reverse-direction start mode. It is firstly switching from a CatchSpin state to an OpenLoop braking state; when the rotation speed of the electric motor is braked to "–Speed_1", where it is determined that the electric motor has been braked to stop due to a very low rotation speed threshold set for "Speed_1", and then switching from the OpenLoop braking state to an OpenLoop electric state; and when the rotation speed of the electric motor reaches "Speed_2" with the forward direction, it is determined that the sufficient counter-electromotive force has been established for the electric motor, thus entering a CloseLoop electric state.

The above switching scheme achieves, in the low-speed reverse-direction start mode, establishing the reliable counter-electromotive force, and then finally switching to the CloseLoop state, thus guaranteeing the sensorless FOC PMSM to start reliably and smoothly, without cost increased, improving the starting performance of the PMSM, thereby expanding application scenarios of the Sensorless FOC PMSM control system.

In some embodiments of the present disclosure, the step of determining the target start mode corresponding to the initial rotation speed and the initial rotation speed direction specifically includes: when judging that the initial rotation speed is lower than a second threshold, and the initial rotation speed direction is a reverse direction or a forward direction, determining the target start mode corresponding to the initial rotation speed and the initial rotation speed direction to be a static start mode.

The scheme of switching the rotation speed control state in the static start mode is set in advance as: switching from a CatchSpin to a direct-current positioning (DC) state; then switching from the DC state to an OpenLoop state; and then switching from the OpenLoop state to a CloseLoop state.

In this technical solution, a condition, where the magnitude of the initial rotation speed of the electric motor does not exceed a second threshold; and the direction of the initial rotation speed of the electric motor is either a reverse direction or a forward direction, indicates that the electric motor has a very low initial rotation speed or has no initial rotation speed, it is then determined that the electric motor is in a static state, thus entering the static start mode.

For the static start mode, it is firstly switching from the detection state to a direct-current positioning (DC) state; then switching from the DC state to an OpenLoop state, to establish a reliable counter-electromotive force (at this time, the estimated rotation speed of the electric motor is reliable and smooth); and thus at this time switching from the OpenLoop state to a CloseLoop state. That is, the involved scheme of switching the rotation speed control state is: the CatchSpin state→the DC state→the OpenLoop state→the CloseLoop state.

It should be noted that in the static start mode, the current loop is the close-loop state; the DC state refers to a state where the rotation speed of the electric motor is equal to zero.

Illustratively, as shown in FIGS. 2 and 4, when the initial rotation speed of the PMSM electric motor is detected by the CatchSpin algorithm to be very low or zero (i.e., "Speed" is greater than or equal to "−Speed_1", and lower than or equal to "Speed_1"), it is determined that the electric motor is in the static state before starting, thus entering the static start mode. It is firstly switching from a CatchSpin state to a DC state; and then switching from the DC state to an OpenLoop electric state; and when the rotation speed of the electric motor reaches "Speed_2" with the forward direction, it is determined that the sufficient counter-electromotive force has been established for the electric motor, thus entering a CloseLoop electric state.

The above switching scheme achieves, in the static start mode, establishing the reliable counter-electromotive force, and then finally switching to the CloseLoop state, thus guaranteeing the sensorless FOC PMSM to start reliably and smoothly, without cost increased, improving the starting performance of the PMSM, thereby expanding application scenarios of the Sensorless FOC PMSM control system.

In some embodiments of the present disclosure, the step of determining the target start mode corresponding to the initial rotation speed and the initial rotation speed direction specifically includes: when judging that the initial rotation speed is greater than or equal to a second threshold and lower than or equal to a first threshold, and the initial rotation speed direction is a forward direction, determining the target start mode corresponding to the initial rotation speed and the initial rotation speed direction to be a low-speed forward-direction start mode, wherein the first threshold is greater than the second threshold.

The scheme of switching the rotation speed control state in the low-speed forward-direction start mode is set in advance as: switching from a CatchSpin state to an OpenLoop state, and then switching from the OpenLoop state to a CloseLoop state.

In this technical solution, a condition, where the magnitude of the initial rotation speed of the electric motor exceeds a second threshold but does not exceed a first threshold; and the direction of the initial rotation speed is a forward direction, indicates that the electric motor is of the forward direction of the initial rotation speed and has a less high initial rotation speed, it is then determined that the electric motor is in a weak tailwind state before starting, thus entering the low-speed forward-direction start mode. For the low-speed forward-direction start mode, it is first switching from the detection state to the OpenLoop state, to establish a reliable counter-electromotive force (at this time, the estimated rotation speed of the electric motor is reliable and smooth); and thus at this time switching from the OpenLoop state to the CloseLoop state.

It should be noted that the low-speed reverse-direction start mode differs from the low-speed forward-direction start mode in that the low-speed reverse-direction start mode requires the rotation speed passing through zero, however such a process transitions automatically after a target rotation speed has been set, thus does not involve state switch. Thus, for both the low-speed reverse-direction start mode and the low-speed forward-direction start mode, the involved scheme of switching the rotation speed control state is always the CatchSpin state→the OpenLoop state→the CloseLoop state.

In the low-speed forward-direction start mode, the current loop is the close-loop state.

Illustratively, as shown in FIGS. 2 and 4, when the initial rotation speed of the PMSM electric motor is detected by the CatchSpin algorithm to be in a forward direction and to be less high (i.e., "Speed" is greater than or equal to "Speed_1", and lower than or equal to "Speed_2"), it is determined that the electric motor is in the weak tailwind state before starting, thus entering the low-speed forward-direction start mode. It is firstly switching from a CatchSpin state to an OpenLoop electric state; and when the rotation speed of the electric motor reaches "Speed_2" with the forward direction, it is determined that the sufficient counter-electromotive force has been established for the electric motor, thus entering a CloseLoop electric state.

The above switching scheme achieves, in the low-speed forward-direction start mode, establishing the reliable counter-electromotive force, and then finally switching to the CloseLoop state, thus guaranteeing the sensorless FOC PMSM to start reliably and smoothly, without cost increased, improving the starting performance of the PMSM, thereby expanding application scenarios of the Sensorless FOC PMSM control system.

In some embodiments of the present disclosure, the step of determining the target start mode corresponding to the initial rotation speed and the initial rotation speed direction specifically includes: when judging that the initial rotation speed is greater than a first threshold and the initial rotation speed direction is a forward direction, determining the target start mode corresponding to the initial rotation speed and the initial rotation speed direction to be a high-speed forward-direction start mode.

The scheme of switching the rotation speed control state in the high-speed forward-direction start mode is set in advance as: switching from a CatchSpin state to a CloseLoop state.

In this technical solution, a condition, where the magnitude of the initial rotation speed of the electric motor exceeds a first threshold and the direction of the initial rotation speed of the electric motor is a forward direction, indicates that the electric motor is of the forward direction of the initial rotation speed and has the very high initial rotation speed, it is then determined that the electric motor is in a high-speed tailwind state before starting, thus entering the high-speed forward-direction start mode.

For the high-speed forward-direction start mode, as the reliable counter-electromotive force has been established, it is directly switching from the CatchSpin state to the CloseLoop state. In the high-speed forward-direction start mode, the involved scheme of switching the rotation speed control state is: the CatchSpin state→the CloseLoop state.

It should be noted that in the high-speed forward-direction start mode, the current loop is the close-loop state.

Illustratively, as shown in FIGS. 2 and 4, when the initial rotation speed of the PMSM electric motor is detected by the CatchSpin algorithm to be in a forward direction and to be very high (i.e., "Speed" is greater than "Speed_2"), it is determined that the electric motor is in the high-speed tailwind state before starting, thus entering the high-speed forward-direction start mode. It is directly switching from a CatchSpin state to a CloseLoop electric state.

The above switching scheme, in the high-speed forward-direction start mode, guarantees the sensorless FOC PMSM to start reliably and smoothly, without cost increased, improving the starting performance of the PMSM, thereby expanding application scenarios of the Sensorless FOC PMSM control system.

It should be noted that in all start modes for the electric motor, the involved states include: the CatchSpin state, the DC state, the OpenLoop state, and the CloseLoop state. In specific, different switching orders of same two states correspond to different processes, for example, switching from the OpenLoop state to the CloseLoop state and switching from the CloseLoop state to the OpenLoop state although both are switches between the OpenLoop state and the CloseLoop state, correspond to different switching processes.

In some embodiments of the present disclosure, the control method further includes: converting a first coordinate system in a first rotation speed control state to a second coordinate system in a second rotation speed control state in the process of switching from the first rotation speed control state to the second rotation speed control state.

Figure 5:
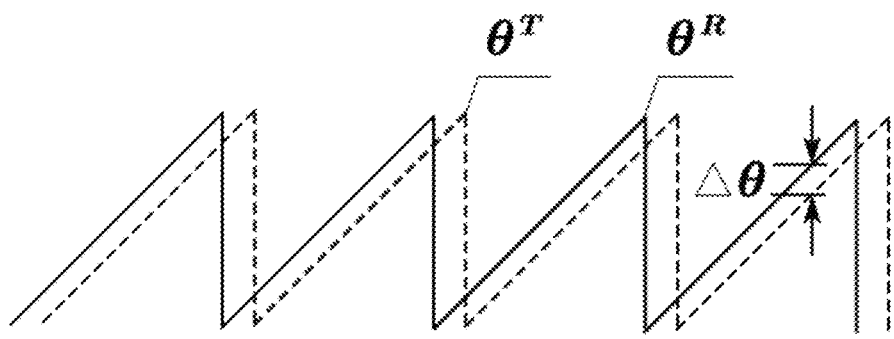
FIG. 5 is a schematic diagram showing deviation between an actual angle and a target control angle for PMSM in an embodiment of the present disclosure.

For the sensorless FOC PMSM control system, upon starting, the existing control method in the related art generally fixes by positioning the PMSM at an initial position, drives the PMSM to a certain rotation speed by means of current close-loop and rotation speed open-loop, to establish the reliable counter-electromotive force, and then forcibly switches to rotation speed close-loop. By the reason that before and after switching from the rotation speed open-loop to the close-loop, an actual rotation speed and angle of the electric motor is not necessarily identical to an estimated rotation speed and angle used when switching to the close-loop, resulting in loss of synchronism for the electric motor in the process of switching. As shown in FIG. 5, $\theta^T$ is a target angle; $\theta^R$ is an actual angle; and $\Delta\theta$ is angle deviation. A slight loss of synchronism may be adjusted back subsequently; while a severe loss of synchronism will cause a failure of switching from the open-loop to the close-loop, thus leading to start failure of the electric motor. To improve success of the start, the electric motor is usually restarted through a second start, however this does not completely avoid the problem of start failure of the electric motor due to the loss of synchronism for the electric motor in the process of switching from the open-loop to the close-loop from a mechanistic perspective.

To enable the PMSM electric motor to start smoothly, it is necessary to ensure seamless connection between various states upon switching. This requires that no sudden change occurs for a current, a voltage, an angle, and an initial value of an integral term of the involved PI controller of a PMSM vector control system in the rotation coordinate system; and it is necessary to consider smooth transition of these physical quantities upon switching between different states, so that finally the PMSM electric motor can be ensured to start smoothly.

In view of this, embodiments of the present disclosure direct to the defect of the control method in the related art, in the process of starting the electric motor, the first coordinate system in the first rotation speed control state and the second coordinate system in the second rotation speed control state are established respectively, upon switching from the first rotation speed control state to the second rotation speed control state for the electric motor, the first coordinate system (i.e., an actual coordinate system) is projected to the second coordinate system (i.e., a target coordinate system), which fundamentally solves the problem of loss of synchronism for the electric motor in the process of the PMSM electric motor switching, thus enabling the PMSM to start smoothly and reliably.

It should be noted that the first rotation speed control state is one of the CloseLoop state and the OpenLoop state; and the second rotation speed control state is the other one of the CloseLoop state and the OpenLoop state. That is, when the first rotation speed control state is the CloseLoop state, the second rotation speed control state is the OpenLoop state; while when the first rotation speed control state is the OpenLoop state, the second rotation speed control state is the CloseLoop state.

Figure 6:
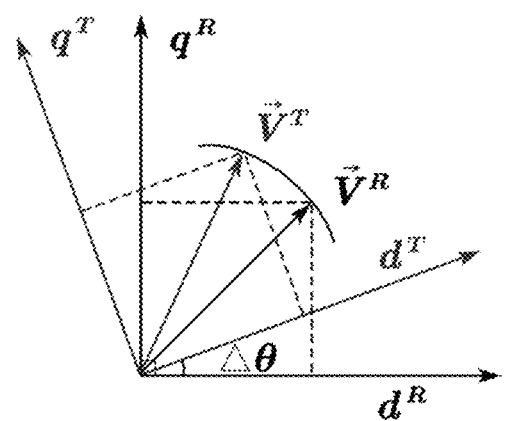
FIG. 6 is a schematic diagram showing projection of an actual coordinate system to a target coordinate system in a dq rotation coordinate system in an embodiment of the present disclosure.

Illustratively, to solve the problem of start failure due to the loss of synchronism for the electric motor in the process of switching from the rotation speed open-loop to the rotation close-loop, or in the process of switching from the rotation speed close-loop to the rotation speed open-loop during the PMSM starting as shown in FIG. 5, the present disclosure provides in embodiments a coordinate system projection method. In specific, as shown in FIG. 6, to prevent a sudden change occurring for an angle, a current and a voltage in the process of switching, on the premise of guaranteeing that a first amplitude of a current synthesized vector Is based on Id and Iq and a second amplitude of a voltage synthesized vector Vs based on Vd and Vq remains unchanged, by means of coordinate rotation transformation, at the moment of switching, an actual coordinate system $d^R q^R$ is projected to a target coordinate system $d^T q^T$, so that an initial value controlled by the target coordinate system starts to change from a final value of the actual coordinate system, thereby ensuring smoothness of the control method. In FIG. 6, $d^T$ represents a d-axis of the target coordinate system; $q^T$ represents a q-axis of the target coordinate system; $d^R$ represents a d-axis of the actual coordinate system; $q^R$ represents a q-axis of the actual coordinate system; and $\vec{v}^T$ represents a target current synthesized vector or a target voltage synthesized vector; and $\vec{v}^R$ represents an actual current synthesized vector or an actual voltage synthesized vector.

The specific projection method is represented by the formulas as follows:

$$\sqrt{d_T^2 + q_T^2} = \sqrt{d_R^2 + q_R^2}$$

$$\Delta\theta = \theta^T - \theta^R$$

$$d^T = d^R \times \cos(\Delta\theta) - q^R \times \sin(\Delta\theta)$$

$$q^T = d^R \times \sin(\Delta\theta) + q^R \times \cos(\Delta\theta)$$

In specific, $d_T$ represents the d-axis voltage or d-axis current in the target coordinate system; $q_T$ represents the q-axis voltage or q-axis current in the target coordinate system; $d_R$ represents the d-axis voltage or d-axis current in the actual coordinate system; $q_R$ represents the q-axis voltage or q-axis current in the actual coordinate system; and $\Delta\theta$ represents the angle deviation between the target angle and the actual angle.

Figure 7:
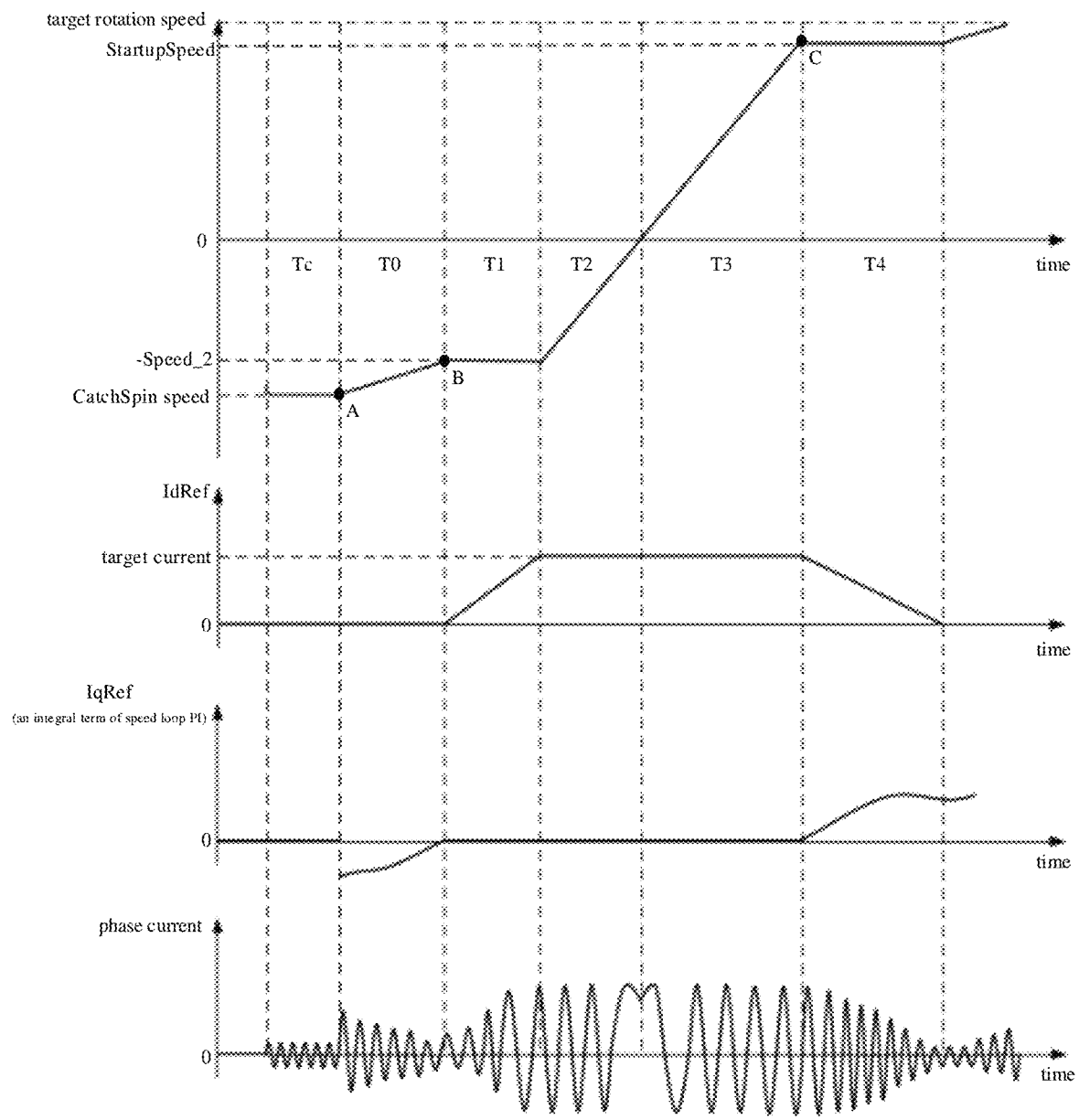
FIG. 7 is a schematic diagram of controlling PMSM to start under a high-speed headwind circumstance in an embodiment of the present disclosure.

FIG. 7 is a schematic diagram of controlling a PMSM to start under a high-speed headwind circumstance in an embodiment of the present disclosure. In some embodiments of the present disclosure, the starting of the Sensorless FOC PMSM control system with the initial rotation speed is classified into five start modes, where the scheme of switching states involved in starting the PMSM under the high-speed headwind circumstance is most complex. In this embodiment, the high-speed reverse-direction start mode is selected to describe how the control method in embodiments of the present disclosure achieves starting the electric motor smoothly and reliably.

(1) In a process of transitioning from the Tc stage (i.e., the CatchSpin stage) to the T0 stage, it involves a process of switching from the CatchSpin state to the rotation speed close-loop (CloseLoop) state. At the moment when the CatchSpin state is switched to the rotation speed close-loop (CloseLoop) state (i.e., the point A), it is necessary to complete coordinate projection of Id, Iq, Vd, Vq in the CatchSpin state to the rotation speed close-loop state, where an angle before the projection is detected by the CatchSpin algorithm; and an angle after the projection is estimated by a SpeedEst module in the rotation speed close-loop state. As the rotation speed close-loop state is entered immediately, it is also necessary to assign a reference value of Iq to an integral term of a speed loop PI as an initial value, and to take a speed estimated by the SpeedEst module as an initial value for a speed reference RAMP module. The state machine of the electric motor is controlled to switch from a CatchSpin state machine to a CloseLpRun state machine.

(2) When the rotation speed of the electric motor has been braked at "−Speed_2" through the rotation speed close-loop state, it is necessary to switch from the close-loop braking state to an open-loop braking state, i.e., transitioning from the T0 stage to the subsequent T1 stage. At the moment when the T0 stage transitions to the T1 stage (i.e., at the point B), it is necessary to project Id, Iq, Vd, and Vq in the rotation speed close-loop state to the rotation speed open-loop state, thus the coordinate projection is also required at this time. In specific, an angle before the projection is estimated by the SpeedEst module in the rotation speed close-loop state; and an angle after the projection is generated by a speed output integral from the speed reference RAMP module. A switching identifier (SwitchFlag) is changed from 1 to 0, indicating the process of switching from the rotation speed close-loop state to the rotation speed open-loop state, where the state machine of the electric motor is controlled to switch from the CloseLpRun state machine to an OpenLpDecRun state machine.

(3) In the T1 stage, it is necessary to establish a sufficient torque for reverse-direction open-loop braking and subsequent forward-direction open-loop driving. At this stage, the target rotation speed remains unchanged, and it is accelerated to a target current required for starting the electric motor through Id RAMP, for use in subsequent stages.

(4) After the T1 stage is completed, the sufficient torque has been established, and the entire T2 stage continues to apply the reverse-direction open-loop braking, with the actual rotation speed of the electric motor continuously approaching 0.

(5) At the end of the T2 stage, the electric motor has been braked to stop, being at the moment of changing from the reverse-direction rotation to the forward-direction speed. The state machine of the electric motor is controlled to switch from an OpenLoop braking state machine to an OpenLoop electric state machine. This moment is a natural transition when the rotation speed of the electric motor changes from the reverse direction to the forward direction, both in the OpenLoop state, and thus no change is required for control physical quantities.

(6) After entering the T3 stage, the torque previously applied to the electric motor is no longer a braking torque, but a forward-direction electric torque, driving the electric motor to continue the open-loop acceleration.

(7) After the T3 stage is completed, the electric motor has been driven by the open-loop to a target start rotation speed (StartupSpeed). At this time, the rotation speed is already sufficient to enable the electric motor to establish a reliable counter-electromotive force, thus subsequently entering the rotation speed close-loop control T4 stage. The state machine of the electric motor is controlled to switch from the OpenLoop electric state machine to the CloseLpRun state machine. At the moment when the T3 stage transitions to the T4 stage (i.e. at the point C), it is necessary to project Id, Iq, Vd, and Vq in the rotation speed open-loop state to the rotation speed close-loop state, thus the coordinate projection is also required at this time. In specific, an angle before the projection is generated by the speed output integral from the speed reference RAMP module; and the angle after the projection is estimated by the SpeedEst module in the rotation speed close-loop state. The state machine of the electric motor is controlled to switch from the OpenLoop electric state machine to the CloseLpRun state machine.

By means of the above described control method for starting the electric motor, it can be seen from the phase current in FIG. 7 that no sudden change occurs in the current phase, i.e., the angle for the electric motor, during the entire starting process. The magnitude of the current transitions naturally, without any disorder or sudden step change to adjust the synchronization.

Figure 8:
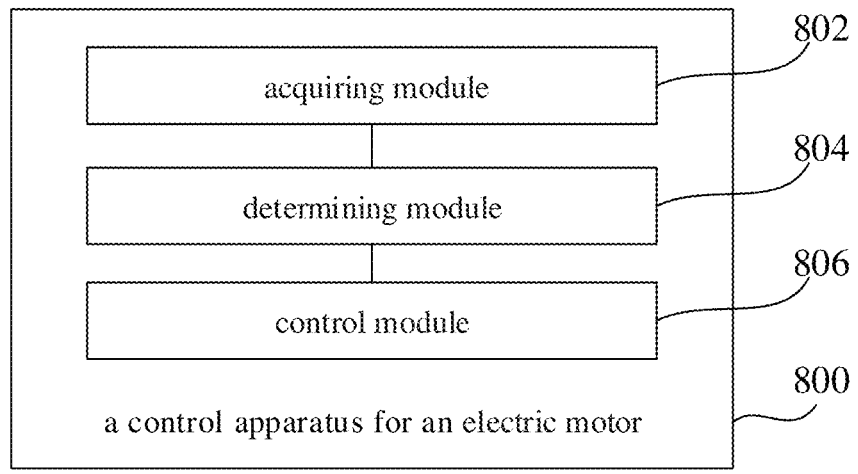
FIG. 8 is a block diagram showing a control apparatus for an electric motor in an embodiment of the present disclosure.

According to some embodiments of the present disclosure, there is provided a control apparatus 800 for an electric motor. As shown in FIG. 8, the control apparatus 800 for the electric motor includes: an acquiring module 802; a determining module 804; and a control module 806.

In specific, the acquiring module 802 is capable of acquiring an initial rotation speed and an initial rotation speed direction of the electric motor; the determining module 804 is capable of determining a target start mode corresponding to the initial rotation speed and the initial rotation speed direction, based on the initial rotation speed and the initial rotation speed direction; and the control module 806 is capable of controlling the electric motor to start in accordance with the target start mode.

In this technical solution, for guaranteeing the electric motor to start smoothly under various circumstances, various initial rotation speeds and various initial rotation speed directions of the electric motor are taken into consideration for the smooth start. In specific, several preset start modes are set in advance, where different initial rotation speeds and different initial rotation speed directions correspond to different start modes, and different start modes in turn decide different start schemes at a start stage of the electric motor.

The initial rotation speed and the initial rotation speed direction are identified in the detection state; the target start mode corresponding to the initial rotation speed and the initial rotation speed direction are determined in several preset start modes, according to the initial rotation speed and the initial rotation speed direction identified in the detection state; and the electric motor is controlled to enter the start stage according to the target start mode.

It should be noted that the electric motor as describe above is the PMSM, applicable to both a built-in permanent magnet synchronous machine and a surface permanent magnet synchronous machine, and particularly is the Sensorless FOC PMSM.

According to embodiments of the present disclosure, the control method can determine an optimal target start mode for the initial rotation speed and the initial rotation speed direction of the electric motor among several preset start modes, thus controlling the electric motor to start. According to embodiments of the present disclosure, the control method can guarantee the sensorless FOC PMSM to start reliably and smoothly under various rotation speed conditions.

Besides, due to consideration of the initial rotation speed before starting, a process of detecting a magnitude and a direction of the initial rotation speed is also referred to a CatchSpin state in embodiments of the present disclosure. In other words, in embodiments of the present disclosure, the initial rotation speed and the initial rotation speed direction of the electric motor are estimated in the CatchSpin state (also referred to as "a detection state"). Accordingly, the present disclosure also provides in embodiments a control method for the electric motor, switching from the CatchSpin state to a start state smoothly.

In some embodiments of the present disclosure, the determining module 804 is further configured to determine a scheme of switching a rotation speed control state corresponding to the target start mode; and the control module 806 is specifically configured to control the electric motor to start in accordance with the scheme of switching the rotation speed control state.

In this technical solution, several preset start modes include: a high-speed reverse-direction start mode, a low-speed reverse-direction start mode, a static start mode, a low-speed forward-direction start mode, and a high-speed forward-direction start mode. In a process of controlling the electric motor to start, based on that the electric motor starts with the initial rotation speed, in an embodiment of the present disclosure, according to the magnitude and the direction of the initial rotation speed, starting of the Sensorless FOC PMSM control system is classified into five start modes, i.e., the high-speed reverse-direction start mode, the low-speed reverse-direction start mode, the static start mode, the low-speed forward-direction start mode, and the high-speed forward-direction start mode, which cover all circumstances for the electric motor starting, guaranteeing a starting effect of the electric motor under various start conditions.

The target start mode is determined from several preset start modes according to the initial rotation speed and the initial rotation speed direction identified in the detection state; the electric motor is in turn controlled to start according to a start scheme corresponding to the target start mode. It should be noted that the start scheme is the scheme of switching the rotation speed control state.

In embodiments of the present disclosure, the control method takes all circumstances under which the electric motor starts, enabling the electric motor to start in accordance with the start scheme meeting the magnitude and the direction of the initial rotation speed, thus improving the reliability and smoothness for starting the electric motor, and guaranteeing the starting effect of the electric motor under various start conditions.

In some embodiments of the present disclosure, the determining module 804 is specifically configured to: when judging that the initial rotation speed is greater than a first threshold and the initial rotation speed direction is a reverse direction, determine the target start mode corresponding to the initial rotation speed and the initial rotation speed direction to be a high-speed reverse-direction start mode.

The scheme of switching the rotation speed control state in the high-speed reverse-direction start mode is set in advance as: switching from a CatchSpin state to a CloseLoop (rotation speed close-loop) state, then switching from the CloseLoop state to an OpenLoop (rotation speed open-loop) state, and then switching from the OpenLoop state to the CloseLoop state.

In this technical solution, a condition, where the magnitude of the initial rotation speed of the electric motor exceeds a first threshold and the direction of the initial rotation speed of the electric motor is a reverse direction, indicates that the electric motor is of the reverse direction of the initial rotation speed and has a very high initial rotation speed, it is then determined that the electric motor is in the high-speed headwind state before starting, thus entering the high-speed reverse-direction start mode.

For the high-speed reverse-direction start mode, it is firstly switching from the CatchSpin state to the CloseLoop state; then switching from the CloseLoop state to the OpenLoop state, to establish a reliable counter-electromotive force (at this time, the estimated rotation speed of the electric motor is reliable and smooth); and thus at this time switching from the OpenLoop state to the CloseLoop state. That is, the involved scheme of switching the rotation speed control state is: the detection state→the CloseLoop state→the OpenLoop state→the CloseLoop state.

It should be noted that in the high-speed reverse-direction start mode, a current loop is a close-loop state. The purpose of switching from the CatchSpin state to the CloseLoop state is to more effectively decelerate and then switch from the CloseLoop state to the OpenLoop state when the rotation speed is inaccurate.

The above switching scheme achieves, in the high-speed reverse-direction start mode, establishing the reliable counter-electromotive force, and then finally switching to the CloseLoop state, thus guaranteeing the sensorless FOC PMSM to start reliably and smoothly, without cost increased, improving starting performance of the PMSM, thereby expanding application scenarios of the Sensorless FOC PMSM control system.

In some embodiments of the present disclosure, the determining module 804 is specifically configured to: when judging that the initial rotation speed is greater than or equal to a second threshold and lower than or equal to a first threshold, and the initial rotation speed direction is a reverse direction, determine the target start mode corresponding to the initial rotation speed and the initial rotation speed direction to be a low-speed reverse-direction start mode, wherein the first threshold is greater than the second threshold.

The scheme of switching the rotation speed control state in the low-speed reverse-direction start mode is set in advance as: switching from a CatchSpin state to an OpenLoop state, and then switching from the OpenLoop state to a CloseLoop state.

A condition, where the magnitude of the initial rotation speed of the electric motor exceeds a second threshold but does not exceed a first threshold; and the direction of the initial rotation speed is a reverse direction, indicates that the electric motor is of the reverse direction of the initial rotation speed and has a less high initial rotation speed, it is then determined that the electric motor is in a weak headwind state before starting, thus entering the low-speed reverse-direction start mode. For the low-speed reverse-direction start mode, it is first switching from the detection state to the OpenLoop state, to establish a reliable counter-electromotive force (at this time, the estimated rotation speed of the electric motor is reliable and smooth); and thus at this time switching from the OpenLoop state to the CloseLoop state.

It should be noted that in the low-speed reverse-direction start mode, the current loop is the close-loop state.

The above switching scheme achieves, in the low-speed reverse-direction start mode, establishing the reliable counter-electromotive force, and then finally switching to the CloseLoop state, thus guaranteeing the sensorless FOC PMSM to start reliably and smoothly, without cost increased, improving the starting performance of the PMSM, thereby expanding application scenarios of the Sensorless FOC PMSM control system.

In some embodiments of the present disclosure, the determining module 804 is specifically configured to: when judging that the initial rotation speed is lower than a second threshold, and the initial rotation speed direction is a reverse direction or a forward direction, determine the target start mode corresponding to the initial rotation speed and the initial rotation speed direction to be a static start mode.

The scheme of switching the rotation speed control state in the static start mode is set in advance as: switching from a CatchSpin to a direct-current positioning (DC) state; then switching from the DC state to an OpenLoop state; and then switching from the OpenLoop state to a CloseLoop state.

In this technical solution, a condition, where the magnitude of the initial rotation speed of the electric motor does not exceed a second threshold; and the direction of the initial rotation speed of the electric motor is either a reverse direction or a forward direction, indicates that the electric motor has a very low initial rotation speed or has no initial rotation speed, it is then determined that the electric motor is in a static state, thus entering the static start mode.

For the static start mode, it is firstly switching from the detection state to a direct-current positioning (DC) state; then switching from the DC state to an OpenLoop state, to establish a reliable counter-electromotive force (at this time, the estimated rotation speed of the electric motor is reliable and smooth); and thus at this time switching from the OpenLoop state to a CloseLoop state. That is, the involved scheme of switching the rotation speed control state is: the CatchSpin state→the DC state→the OpenLoop state→the CloseLoop state.

It should be noted that in the static start mode, the current loop is the close-loop state; the DC state refers to a state where the rotation speed of the electric motor is equal to zero.

The above switching scheme achieves, in the static start mode, establishing the reliable counter-electromotive force, and then finally switching to the CloseLoop state, thus guaranteeing the sensorless FOC PMSM to start reliably and smoothly, without cost increased, improving the starting performance of the PMSM, thereby expanding application scenarios of the Sensorless FOC PMSM control system.

In some embodiments of the present disclosure, the determining module 804 is specifically configured to: when judging that the initial rotation speed is greater than or equal to a second threshold and lower than or equal to a first threshold, and the initial rotation speed direction is a forward direction, determine the target start mode corresponding to the initial rotation speed and the initial rotation speed direction to be a low-speed forward-direction start mode, wherein the first threshold is greater than the second threshold.

The scheme of switching the rotation speed control state in the low-speed forward-direction start mode is set in advance as: switching from a CatchSpin state to an OpenLoop state, and then switching from the OpenLoop state to a CloseLoop state.

In this technical solution, a condition, where the magnitude of the initial rotation speed of the electric motor exceeds a second threshold but does not exceed a first threshold; and the direction of the initial rotation speed is a forward direction, indicates that the electric motor is of the forward direction of the initial rotation speed and has a less high initial rotation speed, it is then determined that the electric motor is in a weak tailwind state before starting, thus entering the low-speed forward-direction start mode. For the low-speed forward-direction start mode, it is first switching from the detection state to the OpenLoop state, to establish a reliable counter-electromotive force (at this time, the estimated rotation speed of the electric motor is reliable and smooth); and thus at this time switching from the OpenLoop state to the CloseLoop state.

In specific, the low-speed reverse-direction start mode differs from the low-speed forward-direction start mode in that the low-speed reverse-direction start mode requires the rotation speed passing through zero, however such a process transitions automatically after a target rotation speed has been set, thus does not involve state switch. Thus, for both the low-speed reverse-direction start mode and the low-speed forward-direction start mode, the involved scheme of switching the rotation speed control state is always the CatchSpin state→the OpenLoop state→the CloseLoop state.

It should be noted that in the low-speed forward-direction start mode, the current loop is the close-loop state.

The above switching scheme achieves, in the low-speed forward-direction start mode, establishing the reliable counter-electromotive force, and then finally switching to the CloseLoop state, thus guaranteeing the sensorless FOC PMSM to start reliably and smoothly, without cost increased, improving the starting performance of the PMSM, thereby expanding application scenarios of the Sensorless FOC PMSM control system.

In some embodiments of the present disclosure, the determining module 804 is specifically configured to: when judging that the initial rotation speed is greater than a first threshold and the initial rotation speed direction is a forward direction, determine the target start mode corresponding to the initial rotation speed and the initial rotation speed direction to be a high-speed forward-direction start mode.

The scheme of switching the rotation speed control state in the high-speed forward-direction start mode is set in advance as: switching from a CatchSpin state to a CloseLoop state.

In this technical solution, a condition, where the magnitude of the initial rotation speed of the electric motor exceeds a first threshold and the direction of the initial rotation speed of the electric motor is a forward direction, indicates that the electric motor is of the forward direction of the initial rotation speed and has the very high initial rotation speed, it is then determined that the electric motor is in a high-speed tailwind state before starting, thus entering the high-speed forward-direction start mode.

For the high-speed forward-direction start mode, as the reliable counter-electromotive force has been established, it is directly switching from the CatchSpin state to the CloseLoop state. In the high-speed forward-direction start mode, the involved scheme of switching the rotation speed control state is: the CatchSpin state→the CloseLoop state.

It should be noted that in the high-speed forward-direction start mode, the current loop is the close-loop state.

The above switching scheme, in the high-speed forward-direction start mode, guarantees the sensorless FOC PMSM to start reliably and smoothly, without cost increased, improving the starting performance of the PMSM, thereby expanding application scenarios of the Sensorless FOC PMSM control system.

In some embodiments of the present disclosure, the control module is further configured to convert a first coordinate system in a first rotation speed control state to a second coordinate system in a second rotation speed control state in the process of switching from the first rotation speed control state to the second rotation speed control state.

In this technical solution, for the sensorless FOC PMSM control system, upon starting, the existing control method in the related art generally fixes by positioning the PMSM at an initial position, drives the PMSM to a certain rotation speed by means of current close-loop and rotation speed open-loop, to establish the reliable counter-electromotive force, and then forcibly switches to rotation speed close-loop. By the reason that before and after switching from the rotation speed open-loop to the close-loop, an actual rotation speed and angle of the electric motor is not necessarily identical to an estimated rotation speed and angle used when switching to the close-loop, resulting in loss of synchronism for the electric motor in the process of switching. A slight loss of synchronism may be adjusted back subsequently; while a severe loss of synchronism will cause a failure of switching from the open-loop to the close-loop, thus leading to start failure of the electric motor. To improve success of the start, the electric motor is usually restarted through a second start, however this does not completely avoid the problem of start failure of the electric motor due to the loss of synchronism for the electric motor in the process of switching from the open-loop to the close-loop from a mechanistic perspective.

To enable the PMSM electric motor to start smoothly, it is necessary to ensure seamless connection between various states upon switching. This requires that no sudden change occurs for a current, a voltage, an angle, and an initial value of an integral term of the involved PI controller of a PMSM vector control system in the rotation coordinate system; and it is necessary to consider smooth transition of these physical quantities upon switching between different states, so that finally the PMSM electric motor can be ensured to start smoothly.

In view of this, embodiments of the present disclosure direct to the defect of the control method in the related art, in the process of starting the electric motor, the first coordinate system in the first rotation speed control state and the second coordinate system in the second rotation speed control state are established respectively, in the process of the electric motor switching from the first rotation speed control state to the second rotation speed control state, the first coordinate system is projected to the second coordinate system, fundamentally solving the problem of loss of synchronism for the electric motor in the process of the PMSM electric motor switching, thus enabling the PMSM to start smoothly and reliably.

It should be noted that the first rotation speed control state is one of the CloseLoop state and the OpenLoop state; and the second rotation speed control state is the other one of the CloseLoop state and the OpenLoop state. That is, when the first rotation speed control state is the CloseLoop state, the second rotation speed control state is the OpenLoop state; while when the first rotation speed control state is the OpenLoop state, the second rotation speed control state is the CloseLoop state.

Illustratively, a dq open-loop rotation coordinate system and a dq close-loop rotation coordinate system are established respectively; when the electric motor is controlled to switch from the OpenLoop state to the CloseLoop state, the dq open-loop rotation coordinate system is projected to the dq close-loop rotation coordinate system; alternatively, when the electric motor is controlled to switch from the CloseLoop state to the OpenLoop state, the dq close-loop rotation coordinate system is projected to the dq open-loop rotation coordinate system.

According to some embodiments of the present disclosure, there is provided a control system 700 for an electric motor. The control system 700 for the electric motor includes the electric motor, a memory, and a processor.

In specific, the memory has stored with a program or instruction, the processor when executing the program or instruction implements steps of the control method for the electric motor as described in any of the above embodiments. The memory may be connected to the processor via a bus or other means. The processor may include one or more processing units, which may be a chip such as a Central Processing Unit (CPU), a Digital Signal Processor (DSP), an Application Specific Integrated Circuit (ASIC), and a Field Programmable Gate Array (FPGA).

According to embodiments of the present disclosure, the control system 700 for the electric motor, when the program or instruction is executed by the processor, implements steps of the control method for the electric motor as described in any of the above embodiments. Thus, the control system 700 for the electric motor has all advantages of the control method for the electric motor as described in any of the above embodiments.

According to some embodiments of the present disclosure, there is provided a control system 700 for an electric motor. The control system 700 for the electric motor includes the electric motor; and the control apparatus 800 for the electric motor as described in any of the above embodiments According to embodiments of the present disclosure, the control system 700 for the electric motor includes the electric motor; and the control apparatus 800 for the electric motor as described in any of the above embodiments. Thus, the control system 700 for the electric motor has all advantages of the control apparatus 800 for the electric motor as described in any of the above embodiments.

According to some embodiments of the present disclosure, there is provided a computer-readable storage medium 600, having stored thereon a program or instruction that, when executed by a processor, implements steps of the control method for the electric motor as described in any of the above embodiments.

In specific, the computer-readable storage medium 600 includes a Read-Only Memory (ROM), a Random Access Memory (RAM), a magnetic disc or an optical disc, etc.

According to embodiments of the present disclosure, the computer-readable storage medium 600, when the program or instruction is executed by the processor, implements steps of the control method for the electric motor as described in any of the above embodiments. Thus, the computer-readable storage medium 600 has all advantages of the control method for the electric motor as described in any of the above embodiments.

Figure 9:
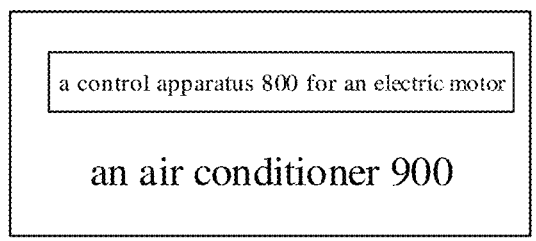
FIG. 9 is a block diagram showing an air conditioner in an embodiment of the present disclosure.

As shown in FIG. 9, according to some embodiments of the present disclosure, there is provided an air conditioner 900. The air conditioner 900 includes the control apparatus 800 for the electric motor as described in any of the above embodiments.

According to embodiments of the present disclosure, the air conditioner 900 includes the control apparatus 800 for the electric motor as described in any of the above embodiments, thus the air conditioner 900 has all advantages of the control apparatus 800 for the electric motor as described in any of the above embodiments.

Figure 10:
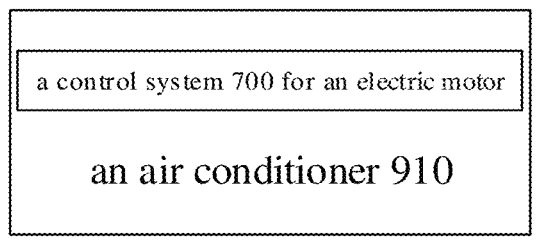
FIG. 10 is another block diagram showing an air conditioner in an embodiment of the present disclosure.

As shown in FIG. 10, according to some embodiments of the present disclosure, there is provided an air conditioner 910. The air conditioner 910 includes the control system 700 for the electric motor as described in any of the above embodiments.

According to embodiments of the present disclosure, the air conditioner 910 includes the control system 700 for the electric motor as described in any of the above embodiments, thus the air conditioner 910 has all advantages of the control system 700 for the electric motor as described in any of the above embodiments.

Figure 11:
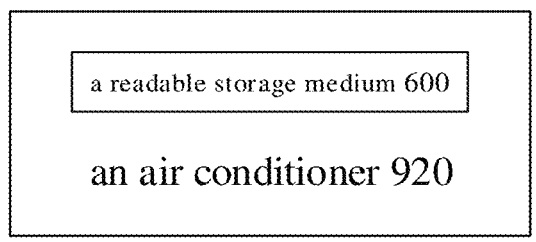
FIG. 11 is still another block diagram showing an air conditioner in an embodiment of the present disclosure.

As shown in FIG. 11, according to some embodiments of the present disclosure, there is provided an air conditioner 920. The air conditioner 920 includes the computer-readable storage medium 600 as described in any of the above embodiments.

According to embodiments of the present disclosure, the air conditioner 920 includes the computer-readable storage medium 600 as described in any of the above embodiments, thus the air conditioner 920 has all advantages of the computer-readable storage medium 600 as described in any of the above embodiments.

The above is merely optional embodiments of the present disclosure and is not intended to limit the present disclosure. For those skilled in the art, various changes and variations can be made to the present disclosure. Any modifications, equivalent replacements, improvements, or the like made within the spirit and principles of the present disclosure shall be included within the protection scope of the present disclosure.

What is claimed is:

1. A control method for an electric motor, comprising:
   acquiring an initial rotation speed and an initial rotation speed direction of the electric motor;
   determining a target start mode for the electric motor according to the initial rotation speed and the initial rotation speed direction;
   determining a scheme of switching a rotation speed control state corresponding to the target start mode; and
   controlling the electric motor to start in accordance with the scheme of switching the rotation speed control state.

2. The control method according to claim 1, wherein the determining the target start mode for the electric motor according to the initial rotation speed and the initial rotation speed direction comprises;
   in response to the initial rotation speed being greater than a first threshold and the initial rotation speed direction being a reverse direction, determining the target start mode to be a high-speed reverse-direction start mode,
   wherein the scheme of switching the rotation speed control state corresponding to the high-speed reverse-direction start mode is: switching from a detection state to a rotation speed close-loop state, subsequently switching from the rotation speed close-loop state to a rotation speed open-loop state, and subsequently switching from the rotation speed open-loop state to the rotation speed close-loop state.

3. The control method according to claim 1, wherein the determining the target start mode for the electric motor according to the initial rotation speed and the initial rotation speed direction comprises:
   in response to the initial rotation speed being greater than or equal to a second threshold and lower than or equal to a first threshold, and the initial rotation speed direction being a reverse direction or a forward direction, determining the target start mode to be a low-speed start mode,
   wherein the scheme of switching the rotation speed control state corresponding to the low-speed start mode comprise: switching from a detection state to a rotation speed open-loop state, and subsequently switching from the rotation speed open-loop state to a rotation speed close-loop state, and
   wherein the first threshold is greater than the second threshold.

4. The control method according to claim 1, wherein the determining the target start mode for the electric motor according to the initial rotation speed and the initial rotation speed direction comprises:
   in response to the initial rotation speed being lower than a second threshold, and the initial rotation speed direction being a reverse direction or a forward direction, determining the target start mode to be a static start mode,
   wherein the scheme of switching the rotation speed control state corresponding to the static start mode is: switching from a detection state to a direct-current positioning state, subsequently switching from the direct-current positioning state to a rotation speed open-loop state, and subsequently switching from the rotation speed open-loop state to a rotation speed close-loop state.

5. The control method according to claim 1, wherein the determining the target start mode for the electric motor according to the initial rotation speed and the initial rotation speed direction comprises:
   in response to the initial rotation speed being greater than a first threshold and the initial rotation speed direction being a forward direction, determining the target start mode to be a high-speed forward-direction start mode, wherein the scheme of switching the rotation speed control state corresponding to the high-speed forward-direction start mode is: switching from a detection state to a rotation speed close-loop state.

6. The control method according to claim 1, further comprising:
converting a first coordinate system in a first rotation speed control state to a second coordinate system in a second rotation speed control state in the process of switching from the first rotation speed control state to the second rotation speed control state.

7. A control system for an electric motor, comprising:
a memory, having stored with a program or instruction; and
one or more processors that, when executing the program or instruction, implements the control method for an electric motor according to claim 1.

8. An air conditioner, comprising:
the control system for an electric motor according to claim 7.

9. A non-transitory computer-readable storage medium having stored thereon a program or instruction that, when executed by one or more processors, implements the control method for an electric motor according to claim 1.

10. An air conditioner, comprising:
the computer-readable storage medium according to claim 6.

11. A control apparatus for an electric motor, comprising:
an acquiring module, configured to acquire an initial rotation speed and an initial rotation speed direction of the electric motor;
a determining module, configured to:
determine a target start mode for the electric motor according to the initial rotation speed and the initial rotation speed direction; and
determine a scheme of switching a rotation speed control state corresponding to the target start mode; and
a control module, configured to control the electric motor to start in accordance with the scheme of switching the rotation speed control state.

12. The control apparatus according to claim 11, wherein the determining module is further configured to:
in response to the initial rotation speed being greater than a first threshold and the initial rotation speed direction being a reverse direction, determine the target start mode to be a high-speed reverse-direction start mode,
wherein the scheme of switching the rotation speed control state corresponding to the high-speed reverse-direction start mode is: switching from a detection state to a rotation speed close-loop state, subsequently switching from the rotation speed close-loop state to a rotation speed open-loop state, and subsequently switching from the rotation speed open-loop state to the rotation speed close-loop state.

13. The control apparatus according to claim 11, wherein the determining module is further configured to:
in response to the initial rotation speed being greater than or equal to a second threshold and lower than or equal to a first threshold, and the initial rotation speed direction being a reverse direction or a forward direction, determine the target start mode to be a low-speed start mode,
wherein the scheme of switching the rotation speed control state corresponding to the low-speed start mode is: switching from a detection state to a rotation speed open-loop state, and subsequently switching from the rotation speed open-loop state to a rotation speed close-loop state, and
wherein the first threshold is greater than the second threshold.

14. The control apparatus according to claim 11, wherein the determining module is further configured to:
in response to the initial rotation speed being lower than a second threshold, and the initial rotation speed direction being a reverse direction or a forward direction, determine the target start mode to be a static start mode,
wherein the scheme of switching the rotation speed control state corresponding to the static start mode is: switching from a detection state to a direct-current positioning state, subsequently switching from the direct-current positioning state to a rotation speed open-loop state, and subsequently switching from the rotation speed open-loop state to a rotation speed close-loop state.

15. The control apparatus according to claim 11, wherein the determining module is further configured to:
in response to the initial rotation speed being greater than a first threshold and the initial rotation speed direction being a forward direction, determine the target start mode to be a high-speed forward-direction start mode,
wherein the scheme of switching the rotation speed control state corresponding to the high-speed forward-direction start mode is: switching from a detection state to a rotation speed close-loop state.

16. The control apparatus according to claim 11, wherein the control module is further configured to:
convert a first coordinate system in a first rotation speed control state to a second coordinate system in a second rotation speed control state in the process of switching from the first rotation speed control state to the second rotation speed control state.

17. A control system for an electric motor, comprising:
a control apparatus for an electric motor according to claim 11.

18. An air conditioner, comprising:
the control apparatus for an electric motor according to claim 11.

* * * * *